Inventors
PAUL G. A. JESPERS
PE TSI CHU
By ALFRED L. M. FETTWEIS
Attorney

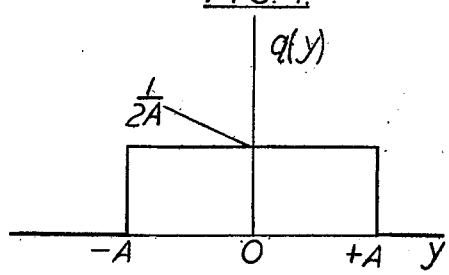
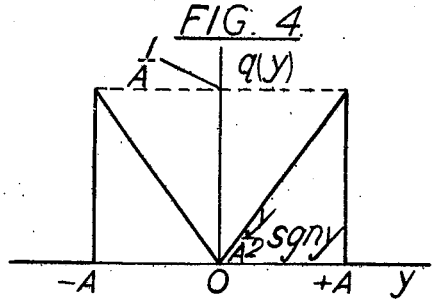
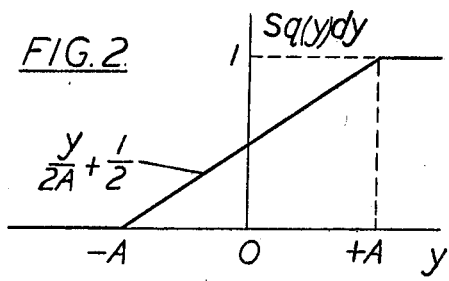
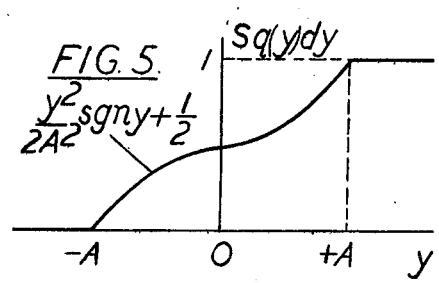
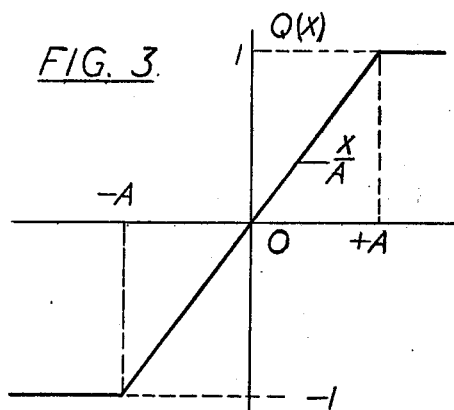
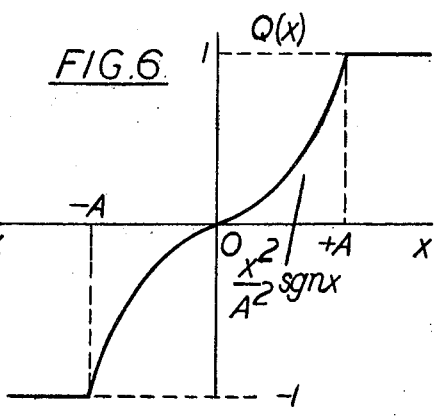
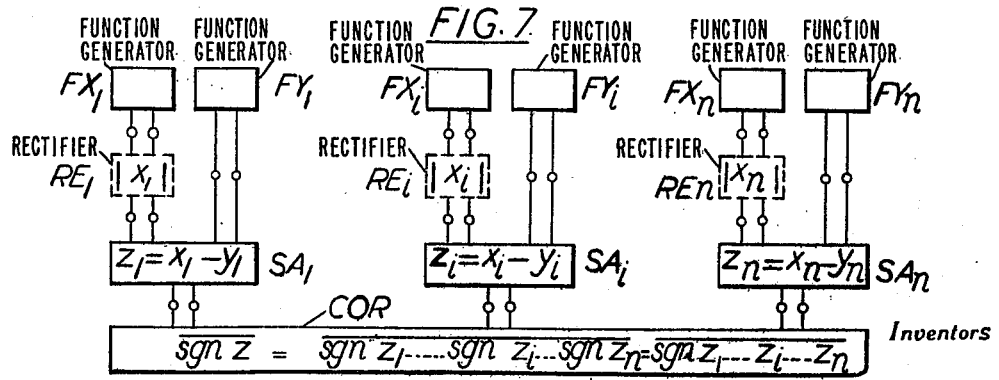

Inventors
PAUL G. A. JESPERS
P.E. TSI CHU
By ALFRED L. M. FETTWEIS
Attorney

Inventors
PAUL G. A. JESPERS
PE TSI CHU
By ALFRED L. M. FETTWEIS
Percy P. Lantry
Attorney 3,495,076
APPARATUS FOR COMPUTING STATISTICAL AVERAGES
Paul Gustave Amelie Jespers, Tervueren, Pe Tsi Chu, Antwerp, and Alfred Leo Maria Fettweis, Berchem-Antwerp, Belgium, assignors to International Standard Electric Corporation, New York, N.Y., a corporation of Delaware
Filed Aug. 22, 1963, Ser. No. 303,762
Claims priority, application Belgium, Sept. 3, 1962, 662,021
Int. Cl. G06g 7/19; G06f 15/34
U.S. Cl. 235—181　　　　　　　　　　　　　　　7 Claims

ABSTRACT OF THE DISCLOSURE

The invention relates to an apparatus for computing statistical averages relative to the input variables applied means to compare various values of each variable with various values of a reference variable individually associated to each variable, the reference variables being statistically independent from one another as well as from the input variables to which they are associated, and to allocate following the results of the comparisons, one or the other distinct predetermined value depending on whether the input variable is larger or smaller than the reference variable which is individually associated thereto, logical means to form in the case of several input variables, a predetermined resultant value function of said predetermined distinct values obtained by each comparison, and adding means to add a plurality of resultant predetermined values and thus permit the computation of statistical averages relative to the input variable applied to the apparatus.

Such an apparatus is already known from the U.S. Patent No. 3,404,261 (P. Jesters and P. T. Chu). Among its applications one finds correlation computations, either of autocorrelation or of crosscorrelation functions, or else higher order correlation functions when more than two variables are present at the inputs of the apparatus and must be correlated together.

Correlators are well known, particularly digital correlators of the general type described for instance in the U.S. Patent No. 2,643,819. Such correlators are generally complex due to the fact that the samples of the two waveforms to be correlated must have their amplitude quantized into multi-digit binary numbers, e.g. 10 bit numbers, which must then be multiplied, a new sampling of the two waveforms giving a new product which will be added to the preceding one and so on. In order to simplify this quantization, it has already been proposed to use polarity coincidence correlators in which the quantization of the pairs of samples from the two waveforms is reduced to its simplest expression as solely the polarity of the amplitude of each of the two samples is determined. In other words, the sign function is computed for each of the samples, the sign function being equal to $+1$ if the variable is positive, 0 if it is nil and $-1$ if it is negative. If the sign functions for the two samples of a pair have the same polarity, i.e. if they are both equal to $+1$ or both equal to $-1$, the polarity of the product of these two samples is positive, i.e. equal to $+1$, while for the other two cases when the two samples of the pair are of contrary signs, the polarity of the product is negative and equal to $-1$. This permits a considerable simplification since the logical circuits to realize such a product are relatively simple and since the product presents itself in the form of a binary digit, the addition of a large number of these products for instance from $10^4$ to $10^6$, to obtain the averages required for such correlation function computations is also very simplified.

A correlator functioning on principle of the polarity coincidence method described above does not permit a correct determination of correlation functions, but in certain cases an analytical relation may be established between the result obtained by a polarity coincidence correlator and an ordinary correlator. Such a relatively simple relation can be established for instance if the stationary random functions whose correlation functions must be calculated have a Gaussian probability density. This is also true in the case of a correlation method intermediate between the method with amplitude quantization and that by polarity coincidence and which is called ring modulator correlation due to the fact that only one of the two samples of a pair is quantized with the help of a sufficient number of bits while only the polarity of the other sample of the pair is taken into account.

It has been found however that by solely using the polarity of signal samples corresponding to the variables whose correlation functions must be calculated, it was possible with such a simplified method to obtain with the help of a sufficient number of samples, a result as exact as that obtained when the samples are quantized with the help of an appreciable number of bits. This possibility exists on condition that to each of the variables is associated a reference variable with a rectangular probability density, such a reference variable being necessary for each of the variables which must be correlated, the reference variables being independent from the variables to be correlated to which they are associated, and also independent from one another. Thus, by adding to each variable to be correlated an auxiliary reference variable of which all values in a predetermined range which is not exceeded by the variable to be correlated present themselves with an equal probability, a modified variable is obtained of which it will be possible to treat samples by the polarity coincidence method and obtain exact correlation functions, independently of the statistical characteristics of the initial random variables.

The correlator described in the reference patent No. 3,404,261 utilizes this principle in a particularly advantageous way since it particularly permits, all things being equal, a computation of correlation functions by digital methods which takes far less time than in accordance with the processes previously known. After obtaining each product from a pair of samples of the two waveforms which must be correlated, and this by the polarity coincidence method, the waveforms having been previously modified by the addition of their individual reference waveforms with rectangular probability density, this product is added to an accumulation of previous products obtained for pairs of samples separated by a given correlation delay. After this, while keeping into memory the polarity of one of the two modified waveforms, one proceeds with a new sampling of the other waveform after a delay equal to the unitary correlation time and the new product thus obtained is in turn added to a corresponding accumulation of such products for the correlation delay which is higher than the preceding one by one time unit. In accordance with the above reference a particularly elegant way to realize these operations consists in using a coordinate memory each row of which contains a word corresponding to the result for a given correlation delay. By successively and cyclically staticizing the various words in a counter by parallel drive of the latter, the state of this counter may then be modified serially when adding a product corresponding to the correlation delay whose partial result is staticized. The new result if then restored and that corresponding to the following correlation delay is in turn staticized. In this manner, with a relatively simple equipment, computations for the whole range of desired correlation delay may be simultaneously preformed. In other words, all the points of the correlogram curve are computed simultaneously, e.g. 100 points.

As described in the above mentioned reference patent, such a correlator which is essentially digital although not exclusively so, may also by simple means permit the calculation of higher order correlation functions, i.e. when there are more than two input variables. As described in the patent, such a correlator may also be used to compute other statistical averages such as the calculation of moments. For the second order moment of variables, one may simultaneously apply the latter to two inputs of such a correlator which after adjunction of two reference variables and determination of the product of the modified variables polarities, will permit to compute such a moment.

One of the principal objects of the present invention is to generalize the method using the reference variables.

Another object of the invention is to realize an apparatus for the computation of statistical averages of functions permitting the computation of moments of any order and relative to any number of variables provided at the input of the apparatus.

In accordance with a main characteristic of the invention, for a series of $n$ variables $x_i(1 \leqslant i \leqslant n)$ where $n$ is an integer at least equal to unity, the apparatus as initially defined permits to compute the statistical average of the produce $Q_1(x_1) \ldots Q_i(x_i) \ldots Q_n(x_n)$, where the functions $Q_i(x_i)$ are arbitrary functions of the corresponding variable $x_i$, by adding to each of the variables $x_i$ before determining its polarity, an associated variable $y_i$ whose probability density $q_i(y_i)$ is equal to $$\frac{1}{2} \frac{dQ_i(y_i)}{dy_i}$$

the various reference variables $y_i$ being statistically independent from the initial variables $x_i$ and statistically independent from one another.

In accordance with another characteristic of the invention, the functions $Q_i(x_i)$ are non linear functions of $x_i$.

In accordance with another characteristic of the invention, the generators of the associated variables $y_i$ produce variables having such characteristics that their corresponding $Q_i(x_i)$ functions are proportional to a power of the variable.

This particular case is especially interesting since it will permit to compute statistical averages on functions which may be integral powers of the variables $x_i$, that is to say that it permits the computation of any moments relative to one or more variables. It can be shown however, that this computation is normally not possible when such exponents are even.

Another object of the invention is to remedy this difficulty.

In accordance with another characteristic of the invention, in the case of Q functions which are even powers of the variable, previous to the association of the corresponding variable $x_i$ with the associated variable $y_i$, the variable $x_i$ is brought to the input of a device, such as a double wave rectifier in the case where this variable is presented in an analogue form, and which produces the modulus of this variable $x_i$, this modulus being associated to the corresponding reference variable $y_i$ by addition or subtraction.

Another object of the invention is to realize a generator for the reference variables $y_i$ which is particularly simple, so as to be able to obtain a Q function which is an arbitrary power of the variable and in particular a power which is not necessarily an integral power.

In accordance with another characteristic of the invention, the reference variables $y_i$ are constituted by series of pulses of exponential shape either uniformly decreasing from a predetermined amplitude which may either be positive or negative but whose modulus is the same for all the pulses of the series, or uniformly increasing from zero towards a positive or negative amplitude whose modulus is the same for all the pulses, each exponential pulse being terminated by a substantially instantaneous return either to the predetermined amplitude (positive or negative) or to the zero amplitude, and these abrupt changes succeeding one another in time in the form of a Poisson distribution.

Indeed, it has been shown that such waveform trains produce a reference variable $y_i$, which may be in particular be sampled at repeated instants, whose statistical properties are such that they correspond to a Q function which is a power of the variable, the exponent being equal to the product of the Poisson constant by the exponential time constant. In this manner, particularly if this product is chosen equal to unity, with the help of these reference waveforms it will be possible to compute ordinary statistical averages and particularly correlation functions, either crosscorrelation or autocorrelation functions, and of any order, as many waveform trains being of course provided as there are variables.

In accordance with yet another characteristic of the invention, such a generator of a pulse train with exponential amplitude variations is characterized by the fact that it comprises a first and a second source of trigger pulses each having a Poisson distribution, a bistable circuit whose inputs are respectively fed by said sources through respective AND gates which are normally unblocked except during a first time delay separated from the appearance of a pulse outgoing from one or the other source by a second time delay, a pulse produced during this first delay authorizing the bistable circuit to unblock either a first or a second gate depending on the condition of this bistable circuit in order to permit during this first time delay the transfer of a predetermined positive charge from a first capacitor towards a third by the resonant transfer method, or the transfer of a charge of equal amplitude to the first but negative, from a second capacitor towards the third by the resonant transfer method, a resistance being provided in association with the third capacitor to produce an exponential discharge of the voltage at the terminals of this third capacitor, and a third and a fourth gates being provided in association with the first and second capacitors to permit the respective recharge to the positive or to the negative voltage of like amplitude except during the time corresponding to the first delay.

In this manner it is possible to create a train of exponential pulses having the above mentioned properties and which all begin at random with a positive or negative amplitude.

It is also possible to realize an analogous circuit producing a waveform of the same type but with a regular alternance of a positive and a negative amplitude.

In accordance with another characteristic of the invention, a generator of a pulse train with exponential amplitude variations is characterized by the fact that it comprises a source of trigger pulses having a Poisson distribution, a bistable circuit operated as a scale-of-two being triggered from one condition to the other at the rhythm of the pulses provided by said source, a pulse produced during a time delay following the appearance of a pulse from said source authorizing the bistable circuit to unblock either a first or a second gate in accordance with the condition of this bistable in order to permit during this time delay the transfer of a predetermined positive charge from a first towards a third capacitor by the resonant transfer method, or the transfer of a charge having an amplitude equal to the first but negative, from a second towards the third capacitor by the resonant transfer method, a resistance being provided in association with the third capacitor to produce an exponential discharge for the voltage at the terminals of this third capacitor, and a third and a fourth gates being provided in associations with the first and second capacitors to permit the respective recharge to the positive or negative voltage of like amplitude, the first or the second capacitor being alternately recharged in accordance with the condition of the bistable circuit.

In accordance with another characteristic of the invention, the reference waveforms $y_i$ are provided by waveform generators constituted by linear networks fed by periodic input pulses.

On condition that the input pulses contain the harmonics which characterize the desired pulses at the output of the linear network, a very large number of periodic waveforms may be produced in this manner giving rise to any type of desired Q functions.

In certain cases however, it is not permitted to measure random phenomena by introducing reference waveforms which are periodic waves and another object of the invention is to permit, still with the help of a linear network, the production of reference waveforms which have no periodic characteristic.

In accordance with another characteristic of the invention, a generator of reference variable $y_i$ is characterized by the fact that it comprises a pulse generator controlled by an amplitude detector fed by the output of a linear network adapted to produce the reference variable $y_i$ having the desired statistical properties, this detector producing a trigger signal upon the waveform at the output of the linear network reaching a predetermined amplitude whatever its polarity, a variable transmission circuit permitting to modify the value of the pulse moment transmitted by the control generator at the input of said linear network, this transmission circuit towards the linear network being modified in a random manner under the control of a random pulse generator and said trigger signal being used to cause the practically instantaneous discharge of the reactive elements of the linear network so that the latter produces the same amplitude function at each pulse whose duration is a random variable.

Indeed, it may be proved in this case that the reference variables are produced by a linear network as previously, but this time without entailing the restrictions inherent to the use of periodic waveforms. It may be shown that such a circuit is particularly suited to the realization of Q functions which are arbitrary powers of the variables and that the exponent in the power of the variable corresponding to the Q function is not merely a positive integer, i.e., it is not restricted to ordinary positive powers of the variables.

For essentially fast correlators such as those of the reference patent, the limit determining the rapidity of computation may be constituted not by the maximum speed of the correlator circuits but by that at which the data is introduced in the latter. This is particularly true if the input variables are presented in a digital form.

In this case, it is particularly interesting to be able to increase the computation speed with regard to the speed of feeding the data since the latter often presents itself on tape memories which, particularly in the case of perforated tape, do not permit an exceptionally rapid feed.

In accordance with another aspect of the invention, the latter is characterized by the fact that in a correlator using a polarity coincidence method in accordance with which a reference variable $y_i$ is associated by addition or by substraction to each variable $x_i$ to compute the sign function of each modified variable $z_i = x_i - y_i$, logical means being provided in the correlator to compute the sign function of the product of all the variables $z_i$ as well as computing means to obtain the statistical average of such a resultant sign function, for each variable $x_i$, a device is foreseen permitting to store a value of this variable during the time that a generator of the associated variable $y_i$ goes through different possible values of the latter.

In accordance with another characteristic of the invention, such a correlator comprises a memory device per variable $x_i$ to store a value of the latter and a counter having at least as many distinct conditions as there are possible values for the variables, individually associated to each memory device with the help of a comparator to determine if the memorized value in the memory device is higher or lower than that of the counter, a partiy detector fed by the binary signals provided by outputs from the different comparators permitting to provide the sign function of the product of the different modified variables $z_i$, the various counters being fed by a pulse generator permitting to make each of the counters pass through all the possible values of the variables, and this from an arbitrary start condition, during the time that a same value is present in a memory device.

Yet another object of the invention is to simplify the realisation of a correlator permitting the computation of correlation of analogous functions from more than two variables.

Such a correlator has been described in the above reference patent and in accordance with a realisation of this patent, without increasing the computation time one may determine the various points of the correlation function even when there are two correlation delays (in the case of three variables) or more. To obtain this result one must however foresee a memory permitting to keep 100 successive samples in the case of 100 point curves since the correlator of the reference patent working in accordance with the time division multiplex principle, this delay is necessary to be able to exploit all the 100 samples corresponding to 100 distinct points of a correlation curve since at the moment these samples are taken, the samples from all the other variables are not necessarily available. Under this aspect the object of the invention is more specifically to eliminate the separate bistable devices which are necessary to store these samples.

In accordance with another characteristic of the invention in a correlator of the type described in the Belgian Patent No. 614,757 where a coordinate memory is provided comprising as many words as there are points to be computed for the correlation function, each word being successively stored in a staticizing device to be eventually modified by the result of a new computation before being reinscribed in the memory and there being a distinct correlation delay time which corresponds to each word, an additional bit is provided for each word of the coordinate memory so that the said bistable devices are effectively constituted by additional bistable devices which are an integral part of the coordinate memory.

The above and other objects and characteristics of the invention will become more apparent and the invention itself will be best understood upon reading the following detailed description of various embodiments of the invention and to be read in conjunction with the accompanying drawings and which represent:

FIG. 1, a rectangular probability density curve;

FIG. 2, the integrated probability density curve corresponding to the probability density represented in FIG. 1;

FIG. 3, an integrated probability density curve which is a linear function of that represented in FIG. 2 and which is useful to explain the invention;

FIG. 4, a probability density curve with linear variations on both sides of the origin of the variable;

FIG. 5, the integrated probability density curve corresponding to the probability density represented in FIG. 4;

FIG. 6, an integrated probability density curve which is a linear function of that of FIG. 5 and which is useful to explain the invention;

FIG. 7, a general embodiment of the invention represented as a block diagram;

FIG. 8, a train of exponentially decreasing pulses from a constant predetermined level which is alternately positive or negative, the sharp edges of these exponential pulses occurring in time as a Poisson distribution;

FIG. 9, a series of exponential pulses similar to those of FIG. 8 but whose starting values of constant and predetermined amplitude are randomly positive or negative;

FIG. 10, a series of exponentially decreasing pulses as those of FIG. 8, but where the starting amplitudes have always the same positive predetermined value;

FIG. 11, a series of exponentially decreasing pulses as those of FIG. 8, but where the starting amplitudes have always the same predetermined negative value;

FIG. 12, a diagram of one of the pulses of FIG. 8, permitting to illustrate the principle of one of the preferred embodiments of the invention to produce the reference waveforms used in the correlator of FIG. 7;

FIG. 13, a diagram of exponentially increasing pulses and constituting an alternative to the decreasing pulses represented in FIGS. 8 to 12;

FIG. 14, a circuit of one of the reference pulse generators of FIG. 7 and producing the pulse train of FIG. 8;

FIG. 15, the circuit of the generator of FIG. 14, modified to produce the pulse train of FIG. 9;

FIG. 16, a train of periodic pulses which may be used to produce auxiliary reference variables of any desired shape with the help of a linear network;

FIG. 17, a second periodic waveform as an alternative to that of FIG. 16;

FIG. 18, a third periodic waveform alternative to that of FIG. 16 and presenting the same symmetry as the latter between the positive and negative half periods;

FIG. 19, a fourth periodic waveform similar to that of FIG. 16, and offering the same statistical properties while reducing the harmonic content;

FIG. 20, a block diagram circuit permitting to use the waveforms of FIGS. 16 to 19 to produce auxiliary reference variables of any desired shape and offering the additional characteristic that they are not periodic;

FIG. 21, a block diagram circuit of a digital correlator permitting a rapid computation of a correlogram in regard to the speed at which variable data is fed into the correlator;

FIG. 22, a diagram of sampling pulses serving to explain the computation of higher order correlation functions; and FIG. 23, a block diagram circuit of a modified part of the correlator of the reference Patent 3,404,261, to considerably simplify such an apparatus in the case where it is provided for the computation of higher order correlation functions.

In order to measure the statistical average of the product of $n$ random variables, or the statistical average of a single random variable, since $n$ may be any positive integer, it is already known that an auxiliary individual variable may be added to or subtracted from each of these variables and on condition that each of these auxiliary variables has a rectangular probability distribution and that they are all statistically independent from the random variables to which they are associated as well as statistically independent from one another, the desired statistical average of the product of the $n$ random variables is equal to the statistical average of the product of the sign functions of these $n$ algebraic sums. In other words, if $x_i (1 \leq i < n)$ defines the $n$ random variables while $y_i$ defines the associated independent variables each of which has a probability density with rectangular distribution, a set of $n$ new variables $z_i$ may be obtained either by the addition of $y_i$ to $x_i$, or by a subtraction. It will be assumed that the auxiliary reference variables $y_i$ are each subtracted from the variables $x_i$ to which they are respectively associated, this solely for the purpose of enabling the derivation of an auxiliary function in a more elegant form as will be seen later. One may thus write:

$$z_i = x_i - y_i \quad (1)$$

If $z$ is the product of the $n$ new variables $z_i$, i.e.

$$z = z_1 \ldots z_i \ldots z_n$$
$$= (x_1 - y_1) \ldots (x_i - y_i) \ldots (x_n - y_n) \quad (2)$$

it may be shown that the statistical average of the function of $z$ or in other words the statistical average of the product of the or sign functions of $z_i$, i.e.

$$\overline{\text{sgn } z} = \overline{\text{sgn } z_1 \ldots \text{sgn } z_i \ldots \text{sgn } z_n}$$

$$\text{sgn } z = \begin{cases} +1 & z > 0 \\ 0 & z = 0 \\ -1 & z < 0 \end{cases} \quad (3)$$

with the sign function as defined above, is proportional to $\overline{x_1 \ldots x_i \ldots x_n}$, i.e. the statistical average of the product of the $n$ variables $x_i$.

In its general form with values of $n$ eventually larger than 2, this result has been applied to the reference patent for the realization of a versatile correlator adapted in particular to the determination of auto- and cross-correlation functions of an arbitrary order.

A proof of this previously known result will now be given by generalizing it to the cases where the auxiliary variables $y_i$ serving as references for the variables $x_i$ to which they are associated, do not necessarily have a rectangular probability distribution but have a generally arbitrary probability density. In this general case, one will be able to prove that $\overline{\text{sgn } z}$, i.e. the statistical average of the sign function of $z = z_1 \ldots z_i \ldots z_n$, is equal to the statistical average of the product of $n$ functions $Q_i(x_i)$ of the respective variables $x_i$ and which functions depend from the probability densities $q_i(y_i)$ of the respective auxiliary variables which are added to the variables $x_i$.

The importance of this result is evident since it is thus possible from the input variables $x_i$ to compute statistical averages not solely on these variables $x_i$ but on functions of these variables $x_i$ which are generally arbitrary and this by the simple choice of auxiliary reference variables $y_i$ having a probability density curve $q_i(y_i)$ which is a function of the corresponding function of $x_i$, namely $Q_i(x_i)$ for which the computation of statistical averages is desired. But it is to be remarked that the adjunction of the variables $y_i$ is anyway required if it is desired to use the polarity coincidence correlation method. Such functions $Q_i(x_i)$ may in particular be powers of $x_i$, i.e. $x_i^{m_i}$, and in this way it becomes possible to calculate the moments of the variables $x_i$, these moments being of an arbitrary order. It will be noted that it was already possible to calculate the moments with the help of the apparatus described in the reference patent, and particularly the second order moments, that is to say in the case of a single function, RMS averages of these functions. But this necessitated feeding the same function towards two separate inputs of the correlator while in the present case whatever be the value of the exponent $m_i$, the variable $x_i$ affected with this exponent must only be fed to a single correlator input.

The proof of the general result enounced above implies the determination of probability $P(z > 0)$ that $z$ should be positive, since one may then immediately show that there exists a simple linear relation between this probability that $z$ should be positive and the statistical average of the sign function of $z$, i.e. $\overline{\text{sgn } z}$. If one considers the relation (2) defining $z$ as the product of the $n$ values $z_i$, it is seen that $z$ shall be positive for all cases where the number of variables $z_i$ which are negative is even. As there are $n$ variables $z_i$, there are thus $2^n$ possibilities for the signs of these variables and for half of these possibilities, i.e. in $2^{n-1}$ cases, the sign of $z$ shall be positive, the other cases corresponding of course, to a negative sign for $z$. One is thus driven to determine first of all the probability that one of the variables $z_i$ would be either positive or negative. This permits to determine the probability that one among the $2^n$ possibilities for the $n$ signs of the variables $z_i$ is realized, and the sum of the $2^{n-1}$ probabilities corresponding to an even number of variables $z_i$ being affected with a negative sign will then give the wanted probability $P(z>0)$ that $z$ should be positive.

It will be recalled that the auxiliary reference variables $y_i$ are statistically independent from the variables $x_i$ and are also statistically independent from one another. In these conditions, the calculation of the probability to have a particular possibility for the $n$ variables $z_i$ among the $2^n$ possibilities in function of the signs of these variables such as a particular case where an even number of these variables $z_i$ bears a negative sign, can be simplified. Indeed, the calculation of such probabilities is obtained by integrating the probability density $p(x_1, \ldots, x_i, \ldots, x_n, y_1 \ldots, y_i \ldots, y_n)$, i.e. the probability density of order $2n$. This integral of order $2n$ must be performed in the domain of the variables $x_i y_i$ which covers all the possible values of these $2n$ variables on condition that for each of the $n$ pairs of variables $x_i \, y_i$, the variables $x_i$ remains always either higher or lower than the auxiliary variables $y_i$ which is associated thereto and thus depending upon the particular case chosen for the signs of the variables $z_i = x_i - y_i$. If the auxiliary variables $x_i$ are statistically independent from the variables $x_i$ and also statistically independent from one another, this probability density of order $2n$ may be decomposed into a product of $n+1$ factors, i.e. the probability density $p(x_1, \ldots, x_i \ldots, x_n)$ multipled by the $n$ ordinary probability densities $q_i(y_i)$ of the $n$ reference variables $y_i$.

The integral of order $2n$ is then simplified into an integral of order $n$ since the ordinary probability densities $q_i(y_i)$ may be separately integrated within the limits of their respective variables $y_i$ which correspond either to the case where the variable $z_i$ is positive, or to the case where it is negative. This ordinary integration for the variable $y_i$ can thus be written:

$$\int_{-\infty}^{x_i} q_i(y_i)dy_i = \frac{1+Q_i(x_i)}{2} \quad z_i = x_i - y_i > 0 \quad (4)$$

$$\int_{x_i}^{\infty} q_i(y_i)dy_i = \frac{1-Q_i(x_i)}{2} \quad z_i = x_i - y_i < 0 \quad (5)$$

The relation 4 corresponds to the case where the modified variable $z_i$ is positive since in that case the limits of the auxiliary variable $y_i$ go from minus infinity to $x_i$. In the case of Equation 5 which corresponds to a value of $z_i$ affected with a negative sign, $x_i$ this time represents the lower limit of the auxiliary variable $y_i$ whose upper limit is equal to plus infinity. The integral of Equation 4 is well known under the name of integrated probability density or yet cumulative distribution function. It is thus a function of $x_i$, the limit of the integral, and its extreme values are equal to zero when $x_i$ is equal to minus infinity and to $+1$ when $x_i$ is equal to plus infinity since the integration of the probability density over all values of the variable to which it refers is equal to unity by definition.

The Equation 4 corresponding to the probability that $z_i$ is positive, the probability that $z_i$ is negative and expressed by Equation 5 is necessarily complementary to the first with respect to unity, since the probability that $z_i$ is equal to 0 is nil, as for a range of continuous values the probability that a random variable should take a particular value of this range is zero. The expressions 4 and 5 introduced a function $Q_i(x_i)$ which is not the integrated probability density defined by the integral 4 but which is tied thereto by a simple linear relation, function $Q_i(x_i)$ being very simply obtained by doubling the integrated probability density and by subtracting unity from the result. Just as it is the fact that $y_i$ is subtracted from $x_i$ to obtain the modified variable $z_i$ which permits to obtain a more elegant formulation introducing the integrated probability density, the introduction of a function of the latter $Q_i(y_i)$, while it is by no means essential to the result which it is desired to prove will nevertheless permit to simplify the formulae as it will be appreciated later on. It will be noted that if the extreme limits of the integrated probability density defined by 4 go from 0 to $+1$, the corresponding limits for $Q_i(x_i)$ go from $-1$ to $+1$, that is to say they precisely correspond to the two extreme values of the sign function defined in 3.

The functions $Q_i(x_i)$ having now been introduced, one may write the probability to have a certain number of values $z_i$ negative and the rest of the $n$ values $z_i$ positive, in the form of an integral of order $n$ using solely the $n$ variables $x_i$, the other $n$ variables $y_i$ having disappeared in the course of the integrations expressed by 4 or 5. This probability to have a particular combination of variables $z_i$ which are negative and the rest of the variables positive can thus be expressed in the form $$\int_{-\infty}^{\infty} dx_1 \ldots \int_{-\infty}^{\infty} dx_i \ldots$$

$$\int_{-\infty}^{\infty} p(x_1, \ldots, x_i, \ldots, x_n) R_n dx_n = I_n(R_n) \quad (6)$$

in which $R_n$ represents a product of $n$ factors of the form given by 4 or 5, i.e.

$$R_n = \frac{1 \pm Q_1(x_1)}{2} \ldots \frac{1 \pm Q_i(x_i)}{2} \ldots \frac{1 \pm Q_n(x_n)}{2} \quad (7)$$

In the expression 6 $I_n$ represents an operator indicating the multiplication by the probability density $p(x_1, \ldots, x_i, \ldots, x_n)$ of order $n$ followed by a multiple integration of order $n$, this so as to simplify the subsequent notation.

If $I_n(R_n)$ represents the probability to have a particular case where some predetermined variables $z_i$ are negative, while the remainder of the $n$ variables $z_i$ are positive, the probability $P(z>0)$ that $z$ should be positive can be obtained as previously explained by making the sum of all the expressions 6 which correspond to an even number of the variables $z_i$ affected with a negative sign while the others are positive. The number of these possibilities is thus equal to $2^{n-1}$ and one may write $$P(z>0) = I_n(S_n) \quad (8)$$

in which $S_n$ is given by $$S_n = \sum_{1}^{2^{n-1}} R_n$$

$$= \frac{1}{2^n} \sum_{1}^{2^{n-1}} [1 \pm Q_1(x_1)] \ldots [1 \pm Q_i(x_i)] \ldots [1 \pm Q_n(x_n)]$$

$$= \frac{1}{2}[1 + Q_1(x_1) \ldots Q_i(x_i) \ldots Q_n(x_n)] \quad (9)$$

The first form of $S_n$ is thus by definition a sum of $2^{n-1}$ terms of the type defined by $R_n$ and the second expression is immediately obtained by replacing $R_n$ by the expression 7. The calculation of this sum of $2^{n-1}$ terms, each being a product of $n$ factors of the type defined by 4 or 5 finally gives the last expression for $S_n$ which is extremely simple since it is equal to half the sum of a unit term and of a term equal to the product of the $n$ functions $Q_i(x_i)$.

This last result is explained by considering that the sum of the $2^{n-1}$ products of $n$ factors shall necessarily introduce a term independent from the functions $Q_i(x_i)$ and equal to $+2^{n-1}$. On the other hand, this sum of $2^{n-1}$ products of $n$ factors shall also give a term $+2^{n-1}Q_1(x_1) \ldots Q_i(x_i) \ldots Q_n(x_n)$ since by definition, for each of the $2^{n-1}$ products comprising all the $n$ functions $Q_i(x_i)$ these products are always positive, the $2^{n-1}$ possibilities corresponding to all the cases where the number of functions $Q_i(x_i)$ affected with a negative sign is even. For all the other terms comprising at least one of the functions $Q_i(x_i)$ but not all the $n$ functions, these terms will also appear $2^{n-1}$ times in the sum, but in half the number of cases they shall be affected with a positive sign whereas in the other half they will be negative. In this way, all these terms constituted by products of functions $Q_i(x_i)$ comprising at least one of these functions but not all, cancel one another which explains the simple final form of $S_n$ given by (9).

Since the sign function of $z$ takes the value $+1$ when $z$ is positive and the value $-1$ when $z$ is negative, the statistical average of the sign function of $z$ may be written:

$$\overline{\operatorname{sgn} z} = (+1)P(z>0) + (-1)P(z>0)$$
$$= 2P(z>0) - 1$$
$$= I_n[1 + Q_1(x_1) \ldots Q_i(x_i) \ldots Q_n(x_n)] - 1$$
$$= \overline{Q_1(x_1) \ldots Q_i(x_i) \ldots Q_n(x_n)} \quad (10)$$

The first expression of the above equation follows immediately from what precedes and the second expression in which $P(z<0)$ has disappeared, follows immediately from the fact that the probability to have $z$, a continuous random variable, equal to 0 is nil and that consequently the probability $P(z<0)$ and $P(z>0)$ are complementary with respect to unity. The third expression for $\overline{\operatorname{sgn} z}$ is obtained by replacing $P(z>0)$ in function of (8) and (9).

Finally, the fourth and last expression for the statistical average of the sign function of $z$ is obtained by remarking that the operator $I_n$ acting on unity, i.e. $I_n(1)$ is equal to unity since (6) indicates that it concerns the integration of the probability density of order $n$ in a domain which covers all possible values of the $n$ variables $x_i$, while the operator $I_n$ acting on the product of the $n$ functions $Q_i(x_i)$ is by definition the statistical average of the product of these $n$ functions.

The proof given above for continuous variables can also be applied to the case of discrete variables considered as a limiting case by introducing delta functions. A separate proof for the case of discrete variables may also be made and leads to the same result.

By calculating the statistical average of the sign function of $z$ it is thus possible to obtain statistical averages not only for the product of the variables $x_i$, but also for generally arbitrary functions $Q_i(x_i)$ of these variables. It is evident that in this way one may considerably enlarge the possibilities of application of the method using auxiliary reference variables whose probability density is rectangular. In particular by using $Q_i$ functions which are integral powers of the $x_i$, it will be possible to compute moments, cross moments included, of any order with the help of a correlator of the type described in the reference patent and by using only one input of this correlator per variable $x_i$ whatever the order of the moments. An illustration relative to the general Formula 10 will first of all be given by assuming that the functions $Q_i(x_i)$ are directly proportional to the corresponding variables $x_i$ which implies that the auxiliary reference variables $y_i$ have a constant probability density since it is clear from (4) that the probability density for the reference variables is a function which is half the derivative of the Q function.

FIG. 1 represents the probability density $q(y)$ for a rectangular distribution. In what follows, the reasoning will relate to one of the $n$ functions and accordingly to facilitate the notation, the subscript such as $i$ shall be suppressed. The probability density $q(y)$ represented as ordinate is a function of $y$ in abscissa and the origin has been chosen in the middle of the range of variation for $y$ for which $q(y)$ has a constant value different from zero. If this range of variation goes from $-A$ to $+A$, the constant non null value of the probability density is thus equal to $$\frac{1}{2A}$$

since the integral of the probability density for all the values of the variable from minus to plus infinity must give unity.

FIG. 2 shows the integral of the curve represented in FIG. 1, i.e. the integrated probability density introduced by (4). As it has already been mentioned, the lower and upper limits of this probability density are respectively 0 and $+1$ and as the probability density of FIG. 1 is zero outside the range from $-A$ to $+A$, the integrated probability density of FIG. 2 remains 0 for the values of $y$ lower than $-A$ and stays equal to $+1$ for all the $y$ values higher than $+A$. Between these two $y$ values, the variation of the integrated probability density is linear as indicated by FIG. 2 since the probability density of FIG. 1 is constant in this zone.

FIG. 3 then represents the Q function introduced by (4) and corresponding to the diagrams of FIGS. 1 and 2. This time $x$ is taken as variable and it is thus the function $Q(x)$ which appears as ordinate since the Q functions are applicable to the initial random variables $x$, contrary to the functions $q$ which represent the probability density of the auxiliary reference variables $y$. As already explained in relation to Equation 4, the Q function is linearly tied to the integrated probability density, being equal to the double of the latter with unity subtracted from this double value. The function $Q(x)$ of FIG. 3 has thus the same linear appearance as that of FIG. 2 between the values from $-A$ to $+A$ for $x$, but below and above these values it remains equal to $-1$ and $+1$ respectively.

FIG. 3 thus permits to verify that the adjunction of the reference variables $y$ having a probability density with a rectangular shape permits to calculate the statistical average of the initial variable, Equation 10 and FIG. 3 indicating that $\overline{x}$ is equal to $A \overline{\operatorname{sgn} z}$ and an analogous result if there are several variables. As described in the reference patent this result permits in particular the calculation of auto- and cross-correlation functions of any order.

The simplest particular case of the exploitation of Formula 10 described with the help of FIGS. 1 to 3 and which corresponds to what has been described in the reference patent, thus corresponds to that where the functions $$Q(x) = \frac{x}{A}$$

are all odd powers of $x$. In the general case where the Q functions are odd powers of the $x$, and not simply proportional to $x$, the corresponding probability densities $q(y)$ will thus be proportional to even powers of $y$ and consequently for the range of variations of $y$ for which these $q$ functions are different from 0, the values of $q$ will always be positive even when $y$ is negative, the value of such a function $q$ remaining unchanged when the sign of $y$ changes.

On the other hand, if one desires to work with Q functions which are even powers of $x$, e.g. for the calculation of second order moments, the probability densities $q$ for the corresponding $y$ variables will necessarily be proportional to odd powers of $y$ which would imply a sign reversal for such a $q$ function when the sign of $y$ is modified and hence negative values for $q$. This is evidently unconceivable since $q$ is always positive by definition with the consequence that the Q functions are monotonic, that is to say, that during their variation between the minimum value $-1$ and the maximum value $+1$ they never diminish in value.

The simplest case in which the Q function is an even power of $x$, i.e. when it is proportional to $x^2$, will now be described.

FIG. 4 represents the shape of the probability density curve for $q$ which outside the zero values for all the values of $y$ which are not comprised within the range extending from $-A$ to $+A$ is given by $$\frac{y}{A^2} \text{ sgn } y$$

In this manner, $q(y)$ presents a linear shape which is required for the $Q(x)$ function which is proportional to $x^2$, but $q(y)$ is nevertheless an even function of $y$ which always remains positive. The $q$ function reaches the maximum value $1/A$ for $y=\pm A$ and it is seen that the surface of the two triangles defined by the $q$ function and the abscissa axis is well equal to unity as required for this probability density.

FIG. 5 represents the integrated probability density corresponding to the probability density $q$ represented in FIG. 4 and as in FIG. 2, the integrated probability density shows a monotonic variation between the extreme values 0 and $+1$ but this variation is no longer linear.

FIG. 6 represents the $Q(x)$ function corresponding to the probability density of FIG. 4 just as the function $Q(x)$ of FIG. 3 corresponded to the integrated probability density represented in FIG. 2. FIG. 6 thus shows that the Q function is this time directly proportional to the square of the variable. Hence it has a parabolic shape between the values of $x=0$ and $+A$, and also a parabolic shape between the values $x=0$ and $-A$, but this time with a reversed sign due to the introduction of the sign function which makes for a Q function which is always monotonic between the extreme values $-1$ and $+1$.

But if the probability density for the $y$ reference variable represented in FIG. 4 is perfectly realizable, the Q function of the corresponding $x$ variable and represented in FIG. 6 is not that which is desired, since due to the introduction of the sign function, necessitated by the probability density of FIG. 4, the $Q(x)$ function of FIG. 6 if it is proportional to $x^2$, is not an even function of $x$ as the even powers of $x$ are. In other words, for the negative values of $x$, the $Q(x)$ function changes its sign which is evidently undesired for the calculation of even order moments.

This difficulty may however be remedied by feeding the variable $x$ whose even order moments must be calculated through a rectifier which provides the modulus of $x$ at its output. In these conditions a Q function is effectively obtained which is proportional to an even power of $x$ without reversal of sign when that of $x$ changes.

In a general manner one may thus define the functions $Q(x)$ by the following relations valid either for odd or for even powers of $x$:

$$Q(x) = \begin{cases} -1 & x < -A \\ \left|\frac{x}{A}\right|^m \text{sgn } x & -A \leq x \leq A \\ +1 & A < x \end{cases} \quad (11)$$

By this definition, whether $m$ is even or odd, $Q(x)$ will always have the same design as $x$ following the introduction of the sign function and consequently Q is a monotonic non-increasing function of $x$, this means that the corresponding probability densities $q$ are always positive in the range outside the zero values as indicated by $$q(y) = \begin{cases} 0 & y < -A \\ \frac{m}{2A}\left|\frac{y}{A}\right|^{m-1} & -A \leq y \leq A \\ 0 & A < y \end{cases} \quad (12)$$

The sign function appearing in (11) which is necessary to preserve the monotonic shape of Q disappears if the variable $x$ is introduced through a rectifier since sgn $|x|$ is always equal to unity whether $x$ is positive or negative and in this manner even order moments may be calculated.

It may be remarked that in the case of even exponents of $x$ which entail the introduction of rectifiers for the corresponding $x$ variables whose even order moments are desired, as the corresponding Q function is only used for positive values of the variable, the corresponding probability density $q$ may in fact be arbitrary for the negative values of the auxiliary variable $y$. The shape of $q(y)$ for the negative variations of $y$ shall of course be such that the surface under the curve in this zone is complementary with respect to unity vis-à-vis the surface under the curve $q(y)$ for the positive values of $y$.

FIG. 7 represents a realization of the invention in the form of blocks and for which it has been assumed that a computation of even order cross moments was desired. FIG. 7 represents generators $FX_1, \ldots, FX_i, \ldots, FX_n$ for the different corresponding variables $x_1, \ldots x_i, \ldots x_n$. The output of each of these generators such as $FX_1$ goes towards one of the inputs of the device such as $SA_1$ which permits to associate the variable $x_1$ with the variable $y_1$ which is produced by the reference variable generator such as $FY_1$. But as it concerns even order moments, a rectifier shown in dotted lines such as $RE_1$ is inserted between $FX_1$ and $SA_1$ to provide to the latter circuit not $x_1$, but $|x_1|$. The associating device $SA_1$ is indicated as providing the difference between $x_1$ and $y_1$ but a summing device may of course be utilized since $y_1$ is transformed into $-y_1$ by a simple inversion of the input wires. In practice anyway one will have to determine on the apparatus, by checks on extreme values, that the polarity of the wires is really correct. The output from $SA_1$ provides the modified variable $z_1$ and the latter is fed at one of the inputs of the device indicated by COR and which may be the digital part of the correlator described in the reference Patent No. 3,404,261. As indicated, the device COR is provided with $n$ inputs which are fed by the outputs from the devices such as $SA_1$ and $SA_n$ analogous to $SA_1$. As indicated, the device COR provides the sign function of $z$.

It may be assumed that the devices generating the variables $x_1$ and $y_1$, i.e. $FX_i$ and $FY_i$ provide the latter in the form of analogue electrical signals. Likewise, in that case a double-wave rectifier may be used for $RE_i$ while the devices $SA_i$ will be operational amplifiers as described in the reference patent. The generator such as $FY_i$ will have to provide an analogue voltage having such a shape as a function of time that the probability density of the amplitude of this reference voltage and which is inversely proportional to the slope of the amplitude variations, has the shape required by the probability density which is demanded for $y_i$ so as to create the Q function for $x_i$.

However, it is not necessary that the generator such as $FX_i$ and $FY_i$ should provide the two types of variables in an analogue form. Either the random variables to be examined, or the reference variables, or yet both types of variables may be provided in a digital form. Likewise, the association device for the two variables such as $SA_i$ and which must serve to their comparison with respect to the 0 reference level may also present itself in the form of a digital comparator of a classical type able for instance to compare two binary numbers. Particularly in the case where the variables to be examined are not offered in the same form as the reference variables, an analogue-digital converter or the reverse may be introduced to express the two types of variables in an identical form, e.g. in an analogue form to permit their comparison with the help of an operational amplifier followed by the determination of the sign of the result.

By considering relation 4, as well as the FIGS. 3 and 6 which clearly show that the Q functions are continuous, non-decreasing bound functions, the lower and upper limits being respectively equal to $-1$ and $+1$, it might be believed that the invention is necessarily limited to the calculation of statistical averages wherein solely such Q functions intervene. But it may be shown that despite these well determined limits for the Q functions and the fact that they must necessarily be non-decreasing since the probability density can never be negative, in accordance with the invention, one may nevertheless calculate expressions having the form $\overline{N_1(x_1) \ldots N_i(x_i) \ldots N_n(x_n)}$ where the N functions may this time be continuous bound functions, either non-increasing or non-decreasing, but without the limits being necessarily equal to $-1$ and $+1$.

Indeed, any $N(x)$ function which is bounded and either non-increasing or non-decreasing may be linearly expressed in function of a $Q(x)$ function which is a non-decreasing function and whose upper and lower limit are $+1$ and $-1$ respectively:

$$N(x) = BQ(x) + C \qquad (13)$$

In the above relation, B and C are constants which may be either positive or negative and C may be chosen in such a way that if the upper and lower limits of $N(x)$ are not equal in amplitude, the C constant can be such that the function $N(x) - C$ has its positive and negative limits equal in amplitude. Then it suffices to choose the other constant B so as to bring this common amplitude for the two limits to the unitary value. In this way it is thus seen that such an N function can be expressed linearly with respect to the Q function. The B constant will be positive if the N function is non-decreasing and it will be negative if this function is non-increasing.

The invention may yet be further generalized, since if one considers the continuous function $M(x)$ with the sole restriction that its variations are bound within a given interval, the latter being arbitrary, such an M function can be expressed as the difference between two functions of the N type, i.e. two bounded non-decreasing functions. One may thus write:

$$M(x) = N_1(x) - N_2(x)$$
$$= B_1 Q_1(x) - B_2 Q_2(x) + C_1 - C_2 \qquad (14)$$

where the second expression is immediately deducted by considering reaction 13. It may be noted that an M function can in fact be expressed by the difference between two bounded and monotonically increasing functions and this with an infinite number of possibilities.

The relation 14 thus shows that any M function, i.e. all the functions that will be encountered in practice since these have always bounded variations, can be expressed by the difference between two Q functions, each of these functions being previously affected of a positive factor, a positive or negative constant being added to the difference between these two terms. Hence, by considering a general expression of the type $\overline{M_1(x_1) \ldots M_i(x_i) \ldots M_n(x_n)}$, the latter can always be calculated in the manner indicated since the product of $n$ functions M can always be decomposed into a sum of terms which as indicated by relation 14, are constituted by a positive or negative constant or by the product of any number of Q functions ($n$ at most) multiplied by a positive or negative constant.

It has been assumed heretofore that the range of each variable is arbitrary, i.e. that it is either finite or infinite. In practice one will in general encounter variables whose amplitude does not exceed a given value and in this case if all the M functions are functions with finite ranges of variation, the Q functions used in the above decomposition shall also have a finite range.

Although continuous functions have been considered above, in practice this restriction may be lifted by tolerating probability densities which include delta functions. In this case the functions M or Q may present discontinuities in the form of sudden changes of predetermined amplitude and such functions may be considered as limiting functions of continuous functions.

Although the apparatus described above is particularly applicable to the measurement of statistical averages in the case of functions of variables, the particular case where these variables are in fact constants may be considered and in this case, relation (10) expressing the statistical average of the sign function of $z$ becomes simply equal to the product of the $n$ functions Q. In this way it is seen that the apparatus described above can be used for the computation of functions of any form, since it has been seen above that they may always be brought back to Q functions, and this by a Monte Carlo method. Such a possibility is thus inherent to an apparatus of the kind described and can prove useful for instance when it is easier to realize the reference variables $y_i$ than the corresponding functions $Q(x_i)$ which are integrated functions of the probability density $q(y_i)$ of the reference variables $y_i$. As in any Monte Carlo method, there will of course be a certain error but the latter may be rendered as small as desired on condition that a sufficient number of samples is taken for the variables $z_i$.

One will now describe a particular method of realizing a Q function and particularly a Q function which is proportional to any positive power of the variable, this positive power not necessarily being an integral number.

An infinite time series of pulses in the manner indicated in FIGS. 8 to 11 may be considered. In each of these figures the pulses are started with an amplitude which may either be positive or negative but whose value is a predetermined unique constant for all the pulses. From this value whose amplitude is unique, the amplitude of each pulse decreases exponentially until the moment when a new pulse appears, the latter starting again from the fixed predetermined amplitude but either at the positive or at the negative level. All these pulses of FIGS. 8 to 11 are thus exponentials whose variable amplitude y can be expressed as $$y = \pm A e^{-\frac{t - t_n}{T_0}} \qquad (15)$$

in which A is the predetermined unique amplitude, $t$ is the time variable, $t_n$ is the moment at which $y$ has either the amplitude $+A$ or $-A$ at the start of the pulse, and $T_0$ is the time constant of the exponential decrease.

If it is assumed that the instants $t_n$ where the various pulses of FIGS. 8 to 11 start, are produced in accordance with a Poisson distribution, it will be possible to demonstrate hereafter that the probability density $q(y)$ of the waves $y$ of the FIGS. 8 to 11, has the required form so that when these references waveforms are associated to corresponding variables $x$, a correlator of the type of FIG. 7 can calculate statistical averages on functions of the variables $x$ which are positive powers of the latter.

It will be noted that in FIG. 8 the positive pulses are regularly alternated with the negative, a pulse starting at the value $+A$ being always stopped by the appearance of a pulse starting at the value $-A$ and so on. In FIG. 9, on the other hand, the sequence of positive and negative pulses is a random one. In FIG. 10, all the pulses are positive while in FIG. 11 they are all negative.

If the case of a positive pulse is considered, one will now calculate the probability $q(y)dy$ to obtain a particular value located between $y$ and $y + dy$, $y$ being higher than 0 and lower than A and $dy$ being positive.

FIG. 12 represents such a pulse starting substantially at the instant $t_n$, a pulse in dotted line producing a positive variation $dy$ of the amplitude $y$ having been represented as well. To this amplitude variation $dy$ corresponds a positive time displacement equal to $dt_n$ as indicated in FIG. 12.

The probability $q(y)dy$ mentioned above can be calculated by considering that it represents the probability that all three following events occur simultaneously;

(1) A new exponential of initial amplitude A starts during the small time interval $dt_n$ in which the instant $t_n$ is comprised;

(2) No new exponential starts during the interval extending from $t_n$ to $t$; and (3) The exponential starting at the instant $t = t_n$ has the initial amplitude $+A$.

It will be remarked first of all that the third event is always independent from the first two and since the instants $t_n$ are assumed to be distributed in accordance with the Poisson law, the first two events are also independent as Poisson's law assumes that the probability of events which occur during non-overlapping intervals are independent from one another.

For a Poisson distribution it is known that the probability to have $s$ events within a time interval T is expressed by $$P(s, T) = \frac{(kT)^s e^{-kT}}{s!} \quad (16)$$

where $k$ is a constant of the Poisson distribution considered. Hence, the probability of the first of the three above mentioned events is directly obtained by replacing $s$ by unity and T by $dt_n$ in the expression (16). As $dt_n$ may be considered as very small, the probability of this first event is thus simply equal to $kdt_n$ which defines the constant $k$ as having such a value that the probability to have one event in an elementary time interval $dt_n$ is $kdt_n$. The constant $k$ thus represents the average number of events per time unit.

The probability of the second above mentioned event, i.e. that of not having a new exponential starting between $t_n$ and $t$ (FIG. 12) is also obtained from the definition (16) by replacing $s$ by 0 and this probability is thus equal to $e^{-kT}$.

Finally, the probability of the third event will be defined by $P_{+A}$ and in this way one may thus write $$q(y)dy = P_{+A}e^{-kT}kdt_n \quad (17)$$

But, by virtue of (15) used with the positive sign since positive pulses are considered, by taking the derivative one may write $$dy = \frac{y}{T_0} dt_n \quad (18)$$

By using this last relation in conjunction with (17) the probability density may finally be written as given by $$q(y) = \frac{kT_0}{A^{kT_0}} |y|^{kT_0-1} P_{\pm A} \quad (19)$$

in which the modulus sign for $y$ has been introduced solely to render the expression (19) equally valid in the case of a negative exponential starting with the amplitude $-A$, the corresponding probability of such a positive or negative pulse having been indicated by $P_{\pm A}$.

In the case of the pulses of FIGS. 8 and 9, the probabilities $P_{+n}$ and $P_{-A}$ are both equal to ½ the coefficient which is thus to be inserted in relation (19) instead of $P_{\pm A}$. Taking relation (4) into account, by integration of the probability density $q(y)$ the corresponding Q function may be derived and it will be expressed in function of the initial variable $x$. By taking the limits of the Q functions into account, relation (19) thus gives for $Q(x)$ the expression $$Q(x) = \left|\frac{x}{A}\right|^{kT_0} \text{sgn } x \quad (20)$$

which is analogous to the $Q(x)$ function represented in FIG. 6 for the particular case where it concerns a function proportional to an even power of the variable and more precisely to the square of the latter.

Relation (20) thus indicates that one may realize any positive power of the variable which need not necessarily be an integral power. It suffices to choose the desired value for the product $kT_0$, that is to say any exponent may be obtained by suitably choosing the Poisson constant $k$ and/or the time constant $T_0$. In particular, it is noted that a rectangular probability distribution for the auxiliary reference variable $y$ and giving a Q function directly proportional to the variable $x$ may be obtained by choosing $kt_0$ equal to unity.

In the case of the pulse series of FIGS. 10 and 11 where the latter always begin with the amplitude $+A$ or with the amplitude $-A$ respectively, one of the two probabilities $P_{+A}$ or $P_{-A}$ will evidently be equal to unity while the other will be null and the following expressions for $q(y)$ and $Q(x)$ can be derived in the case of the pulses of FIG. 10:

$$q(y) = \begin{cases} \frac{kT_0}{A^{kT_0}} y^{kT_0-1} & y > 0 \\ 0 & y < 0 \end{cases}$$

$$Q(x) = \begin{cases} 2\left(\frac{x}{A}\right)^{kT_0-1} & y > 0 \\ -1 & y < 0 \end{cases} \quad (21)$$

and the following corresponding expressions in the case of the pulses from FIG. 11:

$$q(y) = \begin{cases} 0 & y > 0 \\ \frac{kT_0}{A^{kT_0}} y^{kT_0-1} & y < 0 \end{cases}$$

$$Q(x) = \begin{cases} 1 & y > 0 \\ 1 - 2\left(\frac{-x}{A}\right)^{kT_0} & y < 0 \end{cases} \quad (22)$$

The functions defined by (20) will of course be of greater importance since they permit in particular the computation of moments of any order for random variables.

Though it has been assumed in FIGS. 8 to 11 that the pulse amplitudes were decreasing exponentials, variables $y_1$ which are increasing exponential pulses (FIG. 13) may also be used and they are thus defined by $$y_1 = \pm A\left(1 - e^{-\frac{t-t_n}{T}}\right)$$
$$= \pm A - y \quad (23)$$

The second form of expression (23) clearly indicates that the pulses $y$ and $y_1$ have complementary amplitudes with regard to $\pm A$ and consequently it may be verified without difficulty that the results previously indicated in relation to the pulse series of FIGS. 8 to 11 are equally applicable to the cases of analogous series of pulses but exhibiting exponentially increasing amplitudes from zero and always tending towards the same asymptotic value, either $+A$ or $-A$.

By referring to FIGS. 14 and 15, particularly simple embodiments will now be described to produce reference variables $y$ in the form of pulses such as represented in FIG. 8 for the circuit of FIG. 14 and such as represented in FIG. 9 for that of FIG. 15.

By referring to FIG. 14, the latter represents an input terminal connected to the input of a monostable circuit MS in such a way that a pulse present at its input terminal causes the triggering of MS into its unstable condition during a predetermined time interval and independent of the duration of the driving pulse which may be a simple sharp triggering pulse. When it is in its unstable condition, this monostable MS is used to permit either the transfer of a positive charge present on capacitor $C_1$ or that of a negative charge present on capacitor $C_2$, toward a third capacitor $C_0$ and this through the series inductance L. This transfer is effected by the resonant transfer method, that is to say that the charge transfer between $C_1$ and $C_0$, or between $C_2$ and $C_0$, occurs during a time interval which is calculated as equal to the half period of natural oscillations of a series oscillating circuit comprising the two capacitors $C_1(C_2)$ and $C_0$ and the inductance L. If the three capacitors have the same value $C_0$, the transfer time is thus equal to that which is indicated in FIG. 4 in one of the squares of the rectangle symbolizing the monostable MS and this time thus corresponds to that during which MS remains in its unstable condition. Capacitor $C_0$ is connected between ground and the output terminal, and a resistor $R_0$ stands in shunt across this capacitor in such a way that the voltage present across $C_0$ diminishes exponentially with a time constant $T=_0C_0R_0$. In this way, if by the resonant transfer a voltage $\pm A$ is brought across capacitor $C_0$, and if this is produced upon the return of MS to its stable condition, this output voltage A will then decrease exponentially with a time constant $T_0$ and pulses of the type indicated in FIG. 8 are thus produced on condition that the voltages $+A$ and $-A$ are alternately brought on $C_0$.

This is obtained in the following manner. If one considers a pulse driving monostable MS, this pulse coming from a pulse generator (not shown) providing a series of pulses having a Poisson distribution, by causing MS to be triggered into its unstable condition, this pulse will create a pulse at the output of MS whose front edge will be used to cause the triggering of the bistable circuit BS with symmetrical input and used as a scale-of-two. By assuming that BS is triggered into its zero condition, the AND gate $G_1$ which was previously unblocked when BS was in its condition one, and which had allowed the charge of capacitor $C_1$ to the voltage $+A$ through the small source resistance $r_1$, will be blocked, while inversely the analogous gate $G_2$ will be unblocked to begin the charge of capacitor $C_2$ to the voltage $-A$ through the source resistance $r_2$. The AND gate $G_3$ will also be unblocked since BS is in its zero condition while simultaneously the monostable MS is in its unstable condition. On the other hand, this latter fact will be without influence on the state of gate $G_4$ which remains blocked due to the fact that BS is now in its zero condition.

Hence, the unblocking of gate $G_3$ as soon as MS is triggered into its unstable condition upon arrival of the input pulse, corresponds to the start of the resonant transfer between capacitor $C_1$ charged to the voltage $+A$ and capacitor $C_0$ charged to any residual voltage corresponding to the preceding exponential voltage. This charge transfer is effected through gate $G_3$ in series with inductance L and after a half natural oscillation period of this series resonating circuit, the voltage across $C_0$ will now be equal to $+A$ while $C_1$ will have a voltage corresponding to that previously present on $C_0$. If the time duration of this half-period is sufficiently small with respect to the intervals separating two successive input pulses, i.e. if the Poisson $k$ constant for this pulse train is not too high, it may be considered that an exponential variation at the circuit output across the terminals of $C_0$ is suddenly interrupted upon arrival of each new pulse of the Poisson series, the polarity being reversed and passing instantaneously either to the value $-A$ if the current exponential pulse was positive or to the value $+A$ if it was negative. The half period of resonant transfer will advantageously be also small in regard to the period of the sampling pulses of the correlator.

As long as MS is in its unstable condition it cannot be affected by a pulse at the input and the latter could only be occasional since its time constant must be relatively small with respect to the $k$ value defining the average density of the Poisson pulse series. But it is remarked that, from the triggering of MS authorizing the resonant transfer to bring the voltage $+A$ across $C_0$, gate $G_2$ is unblocked at the same time as $G_3$ and also from this moment the capacitor $C_2$ across which the charge present on the $C_0$ had been established when the positive exponential discharge of the latter had been interrupted, will be recharged by source $-A$. From then on, all the resonant transfer time is available to return the voltage $-A$ on $C_2$ through the small charge resistance $r_2$, in such a manner that if the following input pulse presents itself immediately after the return of MS to its stable condition, the new triggering of MS into its unstable condition and entailing the passage of BS to its one condition and the unblocking of $G_4$ will permit the resonant transfer to bring voltage $-A$ from $C_2$ to $C_0$.

If it is desired that the reference variable $y$ should have an even more random character than that of the pulses represented in FIG. 8 where the alternance of the positive and negative pulses is regular, a modified circuit with respect to that of FIG. 14 is represented in FIG. 15 and permits to provide a pulse train analogous to that of FIG. 9.

In FIG. 15, two pulse inputs are provided going towards the AND gates $G_5$ and $G_6$ which are unblocked solely when MS is in its zero condition, i.e. the stable condition. These two input terminals are fed by two Poisson distributed pulse trains statistically independent from one another. If a pulse is present at the terminal feeding $G_5$ and if MS is in its stable condition, the corresponding pulse at the output of $G_5$ drives the zero input of the bistable BS which is now a two-input bistable circuit, and triggers it into its zero condition if it was not already in it. As in FIG. 14, the fact that BS is in its condition zero, tends to authorize gate $G_3$, while it is the condition one of BS which authorizes gate $G_4$. On the other hand, the pulse at the output of $G_5$, in the same way in fact as for the case of a pulse at the output of $G_6$, is sent through the mixer $G_0$ to the input of a second monostable $MS_1$ which remains triggered in its unstable condition during a delay $d$. After this, upon tis automatic return to its zero or stable condition, it produces a trigger pulse at its output which is that used to trigger MS into its unstable condition. Contrary to FIG. 14, gates $G_1$ and $G_2$ are no longer controlled by the state of BS, but by that of MS, these two gates being simultaneously unblocked to permit the respective charges of the capacitors $C_1$ and $C_2$ to the voltages $+A$ and $-A$, while MS remains in its zero condition. The arrival of a driving pulse either at $G_5$ or at $G_6$ and destined to cause the transmission by resonant transfer either of a voltage $+A$ or of a voltage $-A$ on capacitor $C_0$ is not immediately effective. First of all, it will not be admitted to pass gate $G_5$ or gate $G_6$ only if MS is in its zero condition, and this last monostable will only be triggered a time $d$ after this admission which implies that at least this time time $d$ is always available for the recharge of capacitor $C_1$ and $C_2$ to the voltages $+A$ and $-A$. In this manner, the circuit of FIG. 15 ensures that upon the interruption of an exponential discharge of the output capacitor $C_0$, this capacitor voltage will always be returned in a half period of oscillation either to the starting voltage $+A$ or to the starting voltage $-A$, whichever is the input terminal when a new triggering pulse is present. In principle, by analogy with the circuit of FIG. 14, the same time constant may be foreseen for monostable $MS_1$ as for MS.

For many applications, the time series which constitute the reference variables may simply be periodic waves and not necessarily random waves as explained in relation to FIGS. 8 to 15. This possibility is present when the random variables $x_1$ to be analysed do not contain periodic components corresponding to the period of the auxiliary reference wave $y_1$. It is thus of interest to examine the statistical properties of the Q functions of a periodic waveform. A large number of waveforms may be considered but by way of example, the following will be limited to four particularly simple types without that this should constitute any restriction, the method being perfectly applicable to any type of periodic wave.

The interest of the latter in the present case resides in the fact that any periodic wave may always be produced with any degree of approximation by means of linear passive networks, the only condition being that the input wave to the linear network contains all the harmonics which appear in the output waveform. Particularly suitable input waves are for this reason a square wave or periodic waves composed of unit pulses.

FIGS. 16 to 19 represent the four waveforms which will be considered immediately hereafter.

In FIG. 16, the waveform is such that it increases monotonically during a half-period T and that it decreases monotonically during a second half-period T.

The second half-period is a replica of the first with a change of sign for the amplitude and the first half-periods begin with an amplitude 0 to end with a maximum amplitude +A (−A for the second half-periods).

Figure 17:
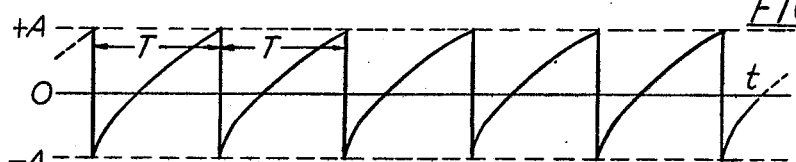
FIG. 17 represents the waveform which monotonically increases from −A to +A for the duration of T which thus corresponds to the whole period of the waveform.
Figure 19:
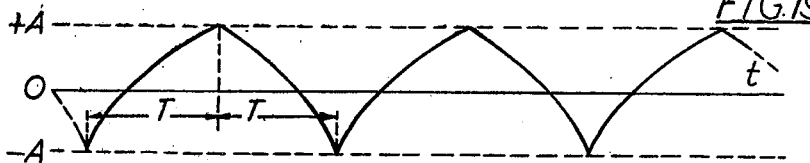

Finally, FIG. 19 represents a waveform which has similar statistical properties to those of FIG. 17 but the sudden change from +A to −A has disappeared in such a way that the high frequency content of the waveform of FIG. 19 is considerably reduced which facilitates its generation. It is seen that the second half-periods correspond to the first if the time scale is reversed.

Figure 16:
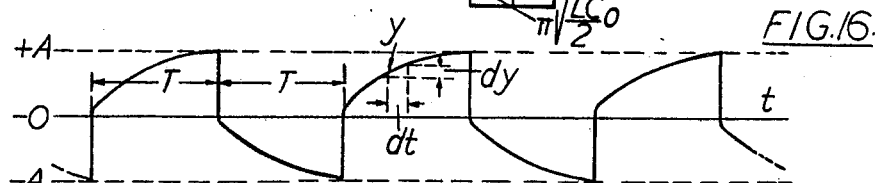

If the periodic waveform in FIG. 16 is first of all examined as $y$ is a monotonically increasing function of $t$ during the first positive half-waves, which does not exclude vertical slopes, nor zero derivatives at certain isolated points, in turn $t$ is a uniquely defined continuous non-decreasing function of $y$ which may be written, by normalizing the variable $t$ with respect to T and the variable $y$ with respect to A, in the form $$\frac{t}{T}=f\left(\frac{y}{A}\right) \qquad (24)$$

where $f$ is thus the inverse function of the time variable with respect to the amplitude and FIG. 16 thus indicates that $f(0)=0$ while $f(1)=1$.

The probability to have an amplitude located between a particular value $y$ and $y+dy$ is defined by $q(y)dy$ where as previously $q(y)$ is the probability density of the $y$ variable. It is seen from FIG. 16 that this probability is proportional to $dt/T$ and that this probability is in fact equal to this ratio between the time increment and the half-period T multiplied by the probability to have a positive $y$ amplitude. As this last probability is equal to ½ in the cause of the waveform of FIG. 16, one may write $$q(y)=\frac{1}{2T}\frac{dt}{dy}=\frac{1}{2A}f'\left(\frac{y}{A}\right) \qquad (25)$$

where the second form of $q(y)$ is directly obtained by differentiating relation (24), $f'$ representing the derivative of $f$. This relation is evidently valid for a positive $y$ value and in the contrary case $y/A$ in (25) must be replaced by $-y/A$ in such a manner that the variable remains positive.

To calculate the function Q, the relation (4) will now be used in a modified form in which the notation has also been simplified by abandoning the subscripts which are of no interest in what follows and also by avoiding the passage from the variable $y$ to the variable $x$ when passing from the function $q$ to function Q, the role of the functiontions $x$ and $y$ being now well established and this change of variable adding nothing to the understanding of the present considerations. In function of (4) one may write $$\frac{1}{2}Q(y)=-\frac{1}{2}+\int_{-\infty}^{y}q(y)dy$$

$$=-\int_{-\infty}^{y_0}q(y)dy+\int_{-\infty}^{y}q(y)dy=\int_{y_0}^{y}q(y)dy \qquad (26)$$

in which the first version of Q(y) follows immediately from relation (4), $y$ being this time chosen as unique variable for the Q as well as for the $q$ functions. The second expression comes from the replacement of the term ½ by the integral of the function $q(y)$ between the lower limit equal to minus infinity and an upper limit $y_0$ which by definition is that giving the value ½ to this integral. In other words, $y_0$ is the median value of $y$ such that the probability to have $y$ higher than $y_0$ is the same as that of having it lower than this value, these two probabilities being thus equal to ½. The third and last form for the Q function follows immediately. The function Q(y) may thus also be expressed as twice the integral of $q(y)$ between the lower limit $y_0$, as it has just been defined, and the upper limit $y$.

By using expression (26) in which $q(y)$ has been replaced by the value given by (25), one obtains $$Q(y)=2\int_{y_0}^{y}q(y)dy=2\int_{0}^{y}q(y)dy=\left[f\left(\frac{y}{A}\right)\right]_{0}^{y}$$

$$=f\left(\frac{y}{A}\right) \qquad y>0 \qquad (27)$$

$y_0$ being indeed in the case of FIG. 16 equal to 0 as well as $f(0)$. For the waveform of the type of FIG. 16, the function Q(y) is thus simply equal to the inverse function $$f\left(\frac{y}{A}\right)$$

i.e. where the time variable $t$ is function of the amplitude variable $y$ (24). This relation which is valid for positive $y$ becomes $$-f\left(\frac{-y}{A}\right)$$

when $y$ is negative.

The function Q defined by (27) presents the symmetry $Q(-y)=-Q(y)$ if the probability density $q$ presents the symmetry $q(-y)=q(y)$. This indicates that the waveforms of the type of FIG. 16 are suitable to produce any possible Q function with finite range which presents the above symmetry implying in particular that $y_0=0$.

Considering the waveform represented in FIG. 17, by a reasoning analogous to the preceding one, one may write $$q(y)=\frac{1}{T}\frac{dt}{dy}=\frac{1}{A}f'\left(\frac{y}{A}\right) \qquad (28)$$

for the probability density and $$Q(y)=2\int_{y_0}^{y}q(y)dy=2\left[f\left(\frac{y}{A}\right)\right]_{y_0}^{y}$$

$$=2f\left(\frac{y}{A}\right)-2\left(\frac{1}{2}\right)=2f\left(\frac{y}{A}\right)-1 \qquad (29)$$

for the corresponding Q function. For the computation of the latter it is indeed remarked that following the definition of $y_0$ $$f\left(\frac{y_0}{A}\right)=\frac{1}{2}$$

since in the case of FIG. 17 the lower and upper limits $f(-1)=0$ and $f(1)=1$. It is remarked that the present case covers any possible Q function with a finite range.

Figure 18:
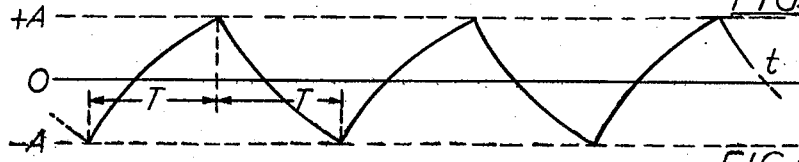
FIG. 18 represents a waveform which increases monotonically from −A to +A during the first half-periods T and which monotonically decreases from +A to −A during the second half-period. The amplitudes of the second half-period are complementary with respect to those of the first half-periods taken in regard of the total variation 2A.

Before examining the case of the waveform of FIG. 18, it can immediately be remarked that that of FIG. 19 is exactly the same as that of FIG. 17 from the point of view of statistical properties and the relation (29) is equally applicable to the waves of FIG. 19 which as seen above have the advantage of not containing as much high frequency energy.

For the case of FIG. 18, the probability density $q$ is directly obtained by remarking that since the first half-periods of duration T are identical for the waves of FIGS. 17 and 18 while there is a sign inversion for the second half-periods, the probability density for the wave of the type shown is FIG. 18 is the arithmetic average of the probability densities for the wave of FIG. 17 depending on whether $y$ is positive or negative. The relation (28) thus permits to write $$q(y) = \frac{1}{2A} f'\left(\frac{y}{A}\right) + \frac{1}{2A} f'\left(\frac{-y}{A}\right) \qquad (30)$$

while the corresponding Q function is written $$Q(y) = 2 \int_{y_0}^{y} q(y) dy = f\left(\frac{y}{A}\right) - f\left(\frac{-y}{A}\right) \qquad (31)$$

since $y_0$ is null and since $q(y)=q(-y)$. It will be remarked that the wave of FIG. 18 thus presents the same basic symmetry $Q(-y)=Q(y)$ than the wave of FIG. 16.

As the use of periodic functions for the auxiliary variables $y_i$ in order to generate Q functions of the random variables $x_i$ to calculate statistical averages of the latter is not always allowed for certain applications, it will now be explained how a random character may be given to the waveforms which have just been discussed in relation to FIGS. 16 to 19. By referring for instance to FIG. 16, it will be possible to modify the duration T in a random manner from one half-period to the next while keeping the function $f(y/A)$ defined by (24) always the same whatever be duration T of the half-period, this duration T now being a random variable. After each half-period, when $y$ reaches either the value $+A$ or $-A$, a new half-period begins whose duration will be statistically independent from the preceding one and so on. In other words, if such a procedure can be satisfactorily realized, this amounts to change the time scale from one half-cycle to the next. The random character of the reference wave may be further increased by changing its sign in a random manner from one half-period to the next. However, as this does not affect in a fundamental way the possibility discussed above, one will continue to reason on the waveform of FIG. 16 where the negative amplitude half-periods always succeed to the positive amplitude half-periods and vice versa.

The possibility which has just been mentioned above does not evidently affect the value of $Q(y)$ since it is seen from the preceding relations that this function does not depend on T. Nevertheless a drawback resides in the fact that it will not in general be possible to produce the waveform with the help of linear networks as envisaged for the periodic waves of FIGS. 16 to 19.

Figure 20:
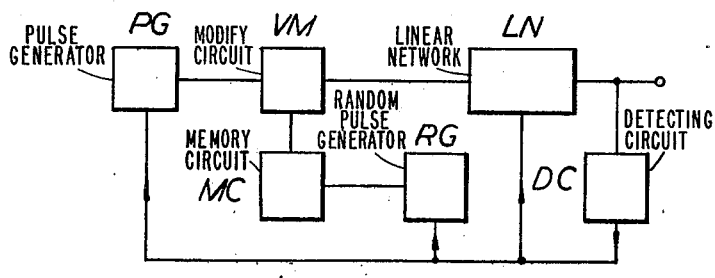

FIG. 20 represents however in block diagram form a circuit permitting to overcome this difficulty, i.e. to generate with the help of linear network waves such as those represented in FIGS. 16 to 19 but which are no longer periodic. FIG. 20 represents a controlled pulse generator PG which feeds a linear network LN designed in such a manner as to produce a waveform having the probability density characteristic suitable to obtain the desired Q function. This feeding of this linear network LN by PG is made by means of a circuit VM which permits to modify the value of the pulse moment transmitted by the generator PG. This moment value which circuit VM can impose is controlled by a memory circuit MC itself controlled by a random pulse generator RG. The circuit MC may for instance be a multistable circuit and which passes from one state to the next at each random pulse received from RG. To each condition of the memory MC corresponds a particular state of the circuit VM affecting the moment value of the pulse feeding the linear network LN.

The element VM may be a pulse modulator circuit which, as indicated, may provide a distinct value of the pulse moment transmitted by the pulse generator PG. The only characteristic of the network LN is that it should be a linear one. Of course, as specified earlier in the description dealing with FIGS. 16 to 19, passive networks are here envisaged. Since, such linear passive networks may provide any periodic waveform with a desired shape such as those of FIGS. 16 to 19, the further elements of FIG. 20 are to remove the periodicity which may be undesirable in certain circumstances. Thus, a simple example of a passive linear network LN would be a simple RC low pass network with the series resistance followed by a shunt capacitance. The latter would be shunted by a normally blocked gate and by unblocking this gate under the control of the DC output, the capacitance would be discharged so that the network would again be devoid of energy during the next wave forming period, this being an essential condition. As noted in the resonant transfer operation, the technique shown for instance in relation to FIG. 15, can also be used to quickly transfer the unwanted charge across the capacitance at the end of a period. Finally, the detecting circuit DC may be a voltage detecting circuit able to deliver an output signal upon the waveform at the output of LN reaching one of the extreme values $+A$ or $-A$.

The waveform produced at the output of LN is detected by a detecting circuit DC which provides an output signal when the waveform reaches either the value $+A$ or $-A$. At this moment, the output signal produced by DC is used to control the discharge of all the reactive elements in the linear network LN whose capacitors in particular will be discharged by short-circuiting them, or whose charges will be evacuated in a well defined time with the help of a resonant transfer towards other capacitors whose charges can be eliminated in the interval between two pulses produced by PG.

Apart from this first function of the output signal from DC, it will also trigger the generator PG in such a manner that it produces a new pulse. Finally, just as the output signal from DC will be used in LN to unblock gates destined to cause the discharge of the reactive elements of this network, this signal or a derived signal may be forwarded to the random pulse generator RG so as to block it for the duration of this signal to preferably avoid a modification of the state of VM during the production of a pulse by PG. During the time separating each pulse provided by PG from the preceding one, generator RG will have sent a series of pulses to MC in such a way that for each new pulse from PG the VM network is in a random state determining a new moment value for the pulse transmitted to the LN network. Of course, the multistable circuit MC could also determine in a random manner the condition of VM in such a way that this circuit transmits pulses whose polarities as well as moment values are random.

It remains to explain in relation to the circuit of FIG. 20 how rendering random the values of the pulse moments driving the linear network LN, constitutes a practical alternative to the control of the half-periods T by a random phenomenon in such a way that these half-periods vary likewise.

Still consisting the circuit of FIG. 20, if $T_a$ is the interval separating two pulses coming from PG, i.e. the time taken by the output wave from LN to reach the value $\pm A$ and if $y_a$ is the variable amplitude between these two instants, one may write $$\frac{t}{T_A} = f\left(\frac{y_a}{A}\right) \qquad (32)$$

where the time variable is still expressed in function of the amplitude, as defined by (24). During the following time interval $T_b$ until the moment when the detector DC again reacts because the output amplitude has again reached the value $\pm A$, the function $f$ remains the same as previously, since the linear network LN is found in the same starting condition upon each pulse from PG and one may thus write $$\frac{t}{T_b} = f\left(\frac{y_b}{A}\right) \qquad (33)$$

where $y_b$ represents the amplitude variation during the second time interval $T_b$, the time origin for the variable $y_b$ each time corresponding to the instant at which the new pulse is produced by PG.

If the function $f$ is such that the ratio between the two functions $f$ intervening in (32) and (33) can be expressed in function of a single variable constituted by the ratio between $y_a$ and $y_b$, which will be the case when the function $f$ is an arbitrary power of the $y$ variable, by dividing Equation 33 by Equation 32 one will be able to write:

$$\frac{T_a}{T_b} = \frac{f\left(\frac{y_b}{A}\right)}{f\left(\frac{y_a}{A}\right)} = \left(\frac{y_b}{y_a}\right)^m = \left(\frac{M_b}{M_a}\right)^m \quad (34)$$

since the amplitudes of the signals $y$ produced by LN during each interval between two pulses from PG are evidently proportional to the value of the moment of the pulse from PG having triggered these variations. The moments of the pulses driving network LN and producing variations $y_b$ and $y_a$ at the output of this linear network are respectively designated by $M_b$ and $M_a$ in the preceding relation from which it also appears that $f$ has been indicated as $m^{\text{th}}$ power of $y/A$. Relation (34) thus indicates that for each variation at the output of LN and generated by a pulse from PG, the product of the total duration of this variation up to the amplitude $\pm A$, e.g. $T_a$, multiplied by a power of the value of the moment of the corresponding pulse sent by VM to the input of LN is a constant.

What precedes thus indicates that the circuit of FIG. 20 while using a linear network for the production of a waveform having the desired statistical properties may produce waveforms which are not periodic and whose positive and negative half waves present themselves in the form of random duration phenomena.

Figure 8:
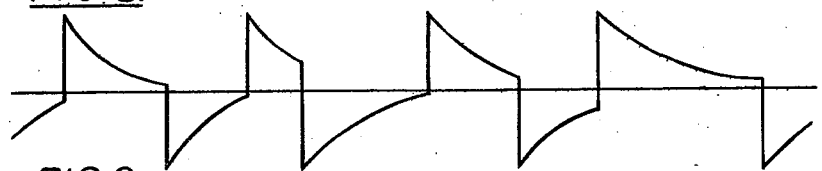
Figure 9:
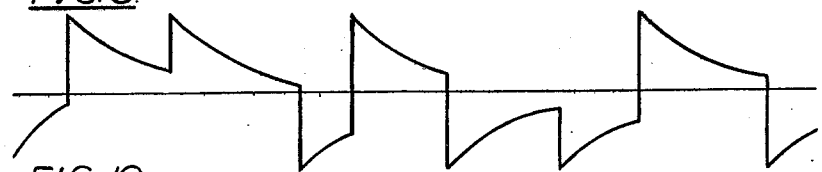
Figure 10:
Figure 11:
Figure 12:
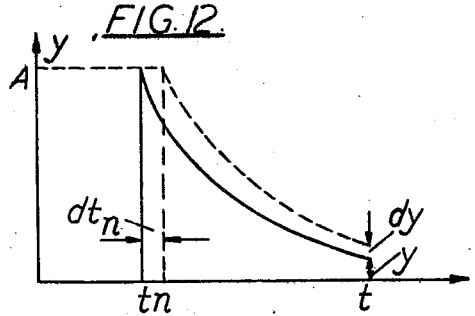
Figure 13:
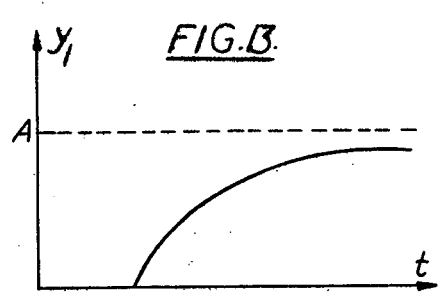
Figure 14:
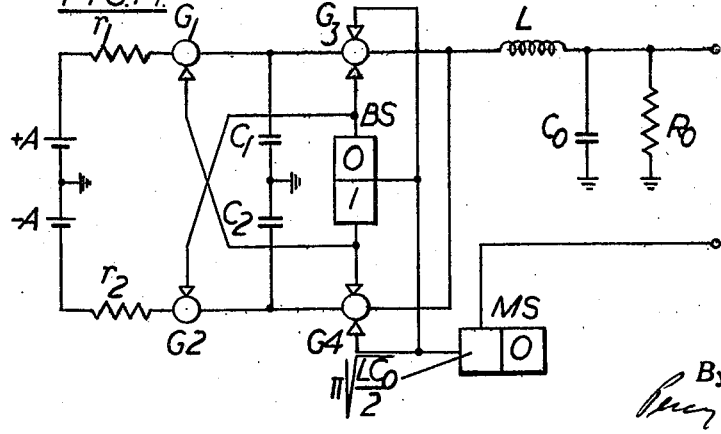
Figure 15:
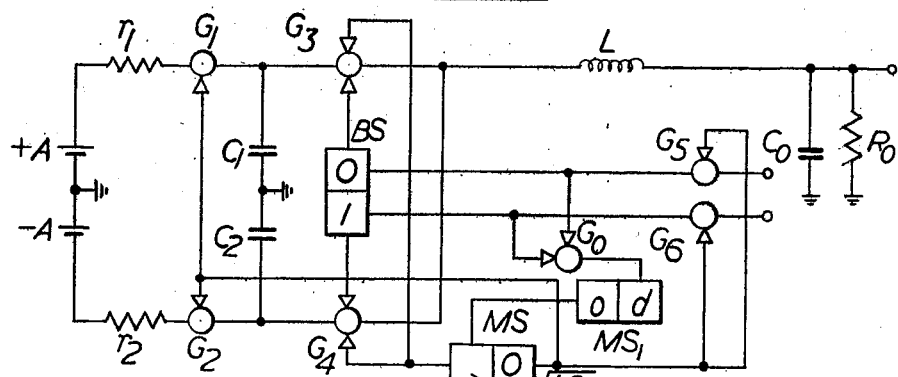

If in principle the circuit of FIG. 20 is more complex than those of FIGS. 14 and 15, it will be remarked that it offers the supplementary property of being able to calculate statistical averages with the help of the correlator of FIG. 7 on Q functions which are arbitrary powers of the variable, i.e. not only powers which are not necessarily integers, but also negative powers.

In the preceding description various ways of producing waveforms for the auxiliary reference variables $y_i$ have been explained in particular with the help of the circuits of FIGS. 14, 15 and 20. It is useful to remark that it is not absolutely essential to have such generators permanently available, i.e. incorporated in the form of the generators $FY_i$ in the assembly of the correlator of FIG. 7. The appropriate waves may be generated once and for all on any appropriate recording device such as for instance perforated tape, magnetic tape, optical films, etc. Another possibility is to solely record triggering pulses distributed in accordance with Poisson's law. One or two pulse sources having such a distribution will then be used in relation to the circuit of FIGS. 14 and 15 for the production of each of the reference waves such as shown in FIGS. 8 to 11. Two sources of such pulses are indicated in the case of the production of the wave of FIG. 9 by the circuit of FIG. 15, but they may have a common origin.

If several reference waveforms are necessary for several variables $x_i$, that is to say when $n$ is greater than unity, for instance, to compute cross-correlation functions or cross moments, one may yet envisage the recording of a waveform, or of pulses to control it, on a single one track recording tape on condition that $n$ reading devices are foreseen which are spaced in such a manner along the tape, or more precisely which permit such lengths of tape between each reading device and the next, that the statistical independence required between the different variables $y_i$ is preserved. In the case of the waves of FIGS. 8 to 11, it will usually be preferable to solely record the triggering pulses since this permits to keep complete freedom for the choice of the exponent $m = kT_o$ without having to change the tape speed, this by a simple variation of the time constant $T_o$. One could, of course, have different tracks on a tape or different tapes carrying the recording of the trigger pulses having Poisson distributions characterized by different values of the constant $k$. Alternatively yet, the tape reading speed could be modified to obtain a coarse setting of the exponent value, the fine setting being still accomplished by adjusting the value of the time constant $T_o$.

It is also evident that the recording of these reference variables can be made either in an analogue or in a digital form. In the last case, with the help of a digital computer for instance, it will be possible to obtaitn an appropriate series of numbers corresponding to any desired probability distribution.

This may be explained in the following manner. First of all a random series of integers may be produced for instance by taking a suitable integer, serving as starting point, to which a certain number of arithmetical operations are applied such as multiplications, additions and subtractions entailing the use of suitable auxiliary integers. In this manner a second integer may be determined from the first and by the same function a third integer from the second and so on in such a manner as to produce a series of integers of arbitrary length. These integers are not of course really statistically independent from one another since they have in fact been generated by a well defined mathematical law. To this end, one could choose in a random manner among several laws and among several numbers intervening in these laws.

However, even with one law and predetermined numbers, if the starting number and the auxiliary numbers intervening in the arithmetical operations as well as the latter are suitably chosen, the integers of the series thus obtained will be statistically independent for any practical purpose since a correlation could only be discovered if the series was prolonged well beyond what is required in practice. Such a series can thus be easily programmed on a digital computer. This having been explained, if it is desired to produce a given number of levels corresponding to those of the reference variable, each of these levels having a corresponding respective probability $V_i$, one may write:

$$P_i = \frac{V_i}{V} \quad (35)$$

where all the values of the numerator $V_i$ are integers as well as the denominator $V$, which may for instance be a power of 10. Since the sum of all the probabilities $P_i$ for all the possible levels of the variable is necessarily equal to unity, one may write $$\sum_{i=1}^{n} V_i = V \quad (36)$$

where $i$ takes all the values from 1 to $n$, assuming there are $n$ possible levels.

By now taking the random series of integers produced as previously explained and which are for all practical purposes statistically independent, from this series a new series of integers may be formed by taking the modulus of the numbers of the first series with respect to $V$, i.e.

$$S_k = R_k \bmod V \quad (37)$$

in which $R_k$ represents an integer from the first series and $S_k$ represents the corresponding number part of the second series and obtained by taking the rest of the division of $R_k$ by $V$ in such a manner that there are only $V$ values for the numbers of the $S_k$ series, i.e. the integers from 0 to $V-1$ included. This module $V$ operation may also be programmed on a digital computer without particular difficulties. Since in practice there exists no correlation between the integers of the $R_k$ series, each of the numbers of the $S_k$ series has an equal probability to occur, i.e., $1/V$. If the different possible $V$ values for the numbers of the $S_k$ series are now split into a number of groups $n$ equal to that of the distinct levels whose respective probabilities one wishes to characterise, one will be able to associate to each of these groups of numbers of the $S_k$ series the level whose probability $P_i$ corresponds to the number $V_i$ of integers in the $S_k$ series which is comprised in the group. In this manner, to each particular level among the $n$ possible, corresponds a certain number $V_i$ of numbers of the $S_k$ series and since all the numbers of this series have an equal probability of occurrence, since there is a total of $V$ different numbers in the series $S_k$, this series of numbers will permit to realize any probability distribution for any number $n$ of levels to which will be associated a number $V_i$ of numbers of the $S_k$ series corresponding to the probability $P_i$ of this level.

For instance, the level 1 of probability $P_1$ will correspond to the numbers from 0 to $V_1-1$, the level 2 of probability $P_2$ to the numbers from $V_1$ to $V_1+V_2-1$, and so on until the level $n$ of probability $P_n$ corresponding to the numbers from $$\sum_{i=1}^{n-1} V_i$$

to $V-1$. The random series of numbers among the values from 0 to $V-1$, each number having the same probability $1/V$ to occur, will thus be recorded by replacing each number of the series by a number or code characterizing the associated level among the $n$ possible ones.

It will now be explained how a correlator using the principle of the polarity coincidence method can be realized in a manner permitting to facilitate the introduction of data into this correlator. The computation speed of a correlator is conditioned not only only by the speed of the logical circuits of which it is built, but also by the speed at which the data representing the variables can be brought to the correlator. As it is the sign functions of the modified variables $z_i$ which must be multiplied together for all these functions to give the resultant sign function, the operation sign $(x_i-y_i)$ must thus be effected. In other words, if the operation $x_i-y_i$ is effected in an analogue manner, only the difference $z_i$ need be sampled.

Particularly, when the data, i.e. the variable $x_i$ is presented in a digital form, it will be the maximum speed at which the input equipment can supply this variable in its digital form which will condition the maximum computation time of a correlogram. This limitation will be particularly felt when the input data $x_i$ is on tape recorders and particularly in the form of a perforated tape whose advancement speed is generally limited. On the other hand, the associated reference variable $y_i$ which must be subtracted from $x_i$ is predetermined and it can be produced by the correlator itself. In the ordinary case considered in the reference patent, the reference variable $y_i$ must have a rectangular probability density and as described in the above patent this may correspond to variables $y_i$ whose levels vary linearly in function of time. With the generator in the correlator itself to produce such a variable $y_i$ either in an analogue form (sawtooth voltage) or in a digital form (counter) after having stored a sample of $x_i$ the variable $y_i$ associated to $x_i$ may be successively caused to pass through these various levels, the same sample of $x_i$ being successively compared with each level of the reference variable which is associated thereto. For a single sample $x_i$ the sign function of $z_i$ may thus be calculated as many times as there are samples of the reference variable $y_i$.

Figure 21:
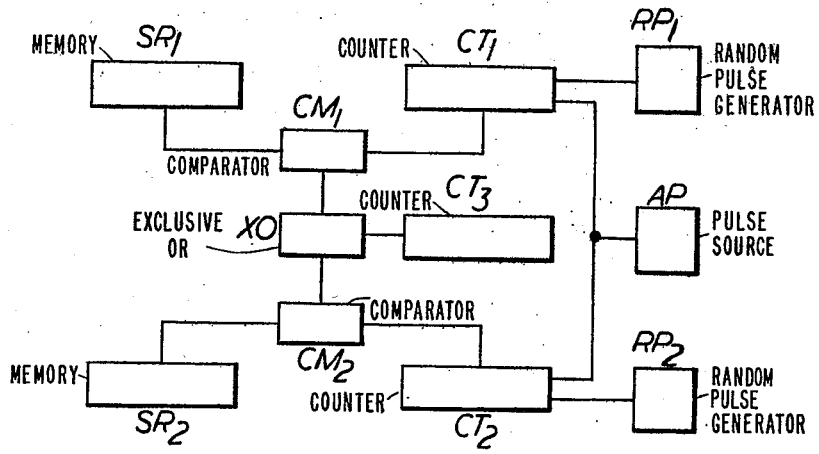

FIG. 21 represents in block diagram form the circuit of a correlator using the above mentioned principles to enable the computation of correlogram at a high speed with respect to the speed of introduction of the $x_i$ data. By assuming that the data $x_i$ is registered in the form of seven-digits binary numbers for instance, each binary number representing a digital sample of the variable $x_i$ is successively registered in the memory $SR_1$ which may for instance be a seven-stage shift register in which the seven-bit number will be inserted either in parallel or in series, this method depending on the recording of the numbers characterizing $x_i$ on the tape (not shown). After each registration of such a number in $SR_1$, counter $CT_1$ which may be a binary counter with seven bistable elements is advanced from one condition to the next under the control of a pulse source AP. At each pulse from AP, the state of $CT_1$ among the 128 possible states is compared with the state of $SR_1$ with the help of comparator $CM_1$. This comparator may be of the parallel inputs type, that is to say that it may be simultaneously fed by the seven pairs of bistable elements constituting $SR_1$ and $ST_1$, or alternatively $CM_1$ might be a serial comparator if it is possible to cyclically advance the information contained in $SR_1$ and $CT_1$, i.e. by making them both function as shift registers. By this serial operation, the comparator $CM_1$ is evidently simplified since it must only operate from a single pair of bistables from $SR_1-CT_1$ through which all the seven digits of the numbers registered in $SR_1$ and $CT_1$ will pass, but it demands the possibility to apply a series of seven advancing pulses to $SR_1$ and $CT_1$ between each AP pulse and the next.

Whatever the method used may be, at each pulse from AP the comparator $CM_1$ will thus be able to provide an output signal indicating if the sample from $x_1$ in $SR_1$ is either larger or smaller than the number inscribed in $CT_1$ which is modified by each pulse from AP, the equality case being grouped with one of the two others.

The AP pulse source is also used to cause the advancement of a counter $CT_2$ which fulfils the same role as $CT_1$ in relation to the register $SR_2$ for the variable $x_2$, the comparator $CM_2$ associating $SR_2$ to $CT_2$ and the outputs of $CM_1$ and $CM_2$ constituting the inputs of an exclusive-OR circuit XOR which exploits the binary results of the two comparators $CM_1$ and $CM_2$ to provide, at the rhythm of the AP pulses, binary output signals which are accumulated in a binary counter $CT_3$. In this manner, for each sample of $x_1$ or $x_2$ respectively stored in $SR_1$ and $SR_2$, they are successively compared to all the possible levels and 128 sign functions of $z_1z_2=(x_1-y_1)(x_2-y_2)$ are thus successively obtained. Counter $CT_3$ may be a reversible binary counter as in the case of FIG. 7 of the reference patent, in which case XO will feed it by complementary signals either to add or to subtract a unit to or from the result accumulated in $CT_3$, but alternatively this counter could be a binary counter which is either advanced by one step or left in its pior condition depending on the binary signal provided by XO, as also explained in the reference patent.

In order to ensure the statistical independence of the reference variables $y_1-y_2$, random pulse generators $RP_1-RP_2$ are provided for the devices $CT_1$ and $CT_2$ respectively so as to be able to place them in a condition characterizing an arbitrary level after each series of the 128 pulses provided by the AP generator, this reset to a random state being effected during the insertion of new samples of $x_1$ and $x_2$ in the $SR_1$ and $SR_2$ memories. A memory device (not shown) will of course be provided to ensure that the generator AP provides the 128 pulses and then stops for each new pair of samples present in $SR_1$ and $SR_2$.

As indicated, for each sample of $x_1-x_2$, 128 sign functions of $z=z_1z_2$ will be calculated which, while tolerating an insertion rhythm for the variables $x_i$ which is relatively slow will nevertheless permit a rapid computation of a point of a correlation curve.

After such a computation, all the series of digital samples from $x_1$ and $x_2$ will again be taken up but the samples of $x_2$ for instance, will be shifted by one sample with respect to those of $x_1$ and the computation will be done again to give the following point of the correlation curve and so on until a desired number of points of this function have been calculated.

In the reference patent, a correlator has been described permitting not only to calculate ordinary autocorrelation and cross correlation functions, but also higher order correlation functions. However, it has been established in this patent that when the number of variables is higher than 2, a difficulty is encountered due to the fact that if after having sampled the resultant variable $z_1 = x_1 - y_1$, the variable $z_2$ may be successively sampled, first of all at the same time as $z_1$, then a unitary correlation delay time after, and so on to cover all the possible correlation delay times, the sample of the third variable $z_3$ for instance is not necessarily available at all the successive instants of the sampling of $z_2$ which is made at a hundred times higher rate if hundred points are calculated per curve. One is solely assured of the presence of the $z_1$ sample, this modified variable serving as reference.

In other words, if there are more than two variables of which the correlation function must be calculated, e.g. three variables, for each measurement there are always two correlation times which intervene in a second order correlation function, the first correlation time representing the delay between the sampling of the second wave and that of the first taken as reference, and the second correlation time representing the delay between the sampling of the third wave and that of the first. So as to be able to combine the result of the three samples and more particularly compute the sign function of the product of the three samples, it is necessary to have the three samples available at a given moment and this presents difficulties in the case of the reference patent where a time multiplexing method has been described permitting to simultaneously compute a series of points of a correlogram. But, when there are at least three variables, all the correlation times are established at a certain value except one which is continually modified by passing through all possible values. This means that assuming three functions for instance, and by assuming that it is the first correlation time which passes through all the possible values: as long as this time has not reached the value established for the second correlation time, it is not possible to exploit the values of the samples found.

In the reference patent it has been explained how this difficulty could be resolved and in accordance with a solution having the advantage of not increasing the computation time, the various samples of the wave which is regularly analyzed so as to produce samples for all the correlation delays with respect to the reference wave sample, are stored in a memory circuit until the following period together with the single sample per cycle of each of the other waves. If the storage of the latter necessitates only a single bistable circuit per wave, the storage of the successive samples of the second wave, i.e. 100 samples taken every 20 microseconds in the case of a correlation delay going from 0 to $99 \times 20 = 1980$ microseconds for the above Belgian patent necessitates 100 bistable circuits. At the present time, such bistable circuits are still relatively costly and it is precisely one of the advantages of the coordinate memories foreseen for the storage of a large number of bits that they offer storage facilities at a reduced cost per bit. But, the correlator of the reference patent working on a time division multiplex basis precisely uses such a coordinate memory for storing 100 words which at any time represent the sum of the different resultant sign functions already obtained for the 100 different correlation delays.

It will now be described how such a memory can be jointly used to temporarily store the 100 samples when higher order correlation functions are computed.

Figure 23:
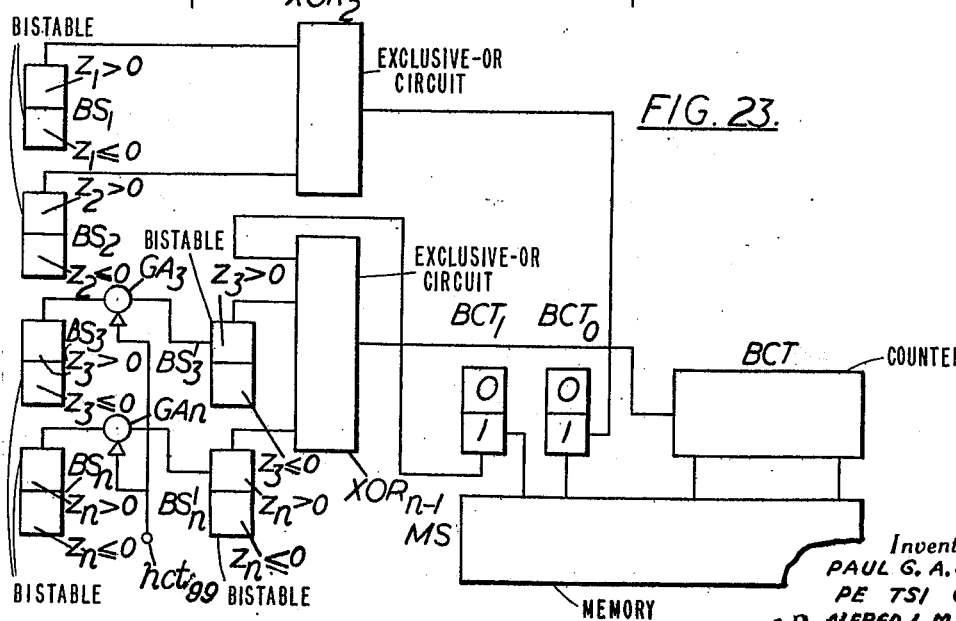

FIG. 23 represents in block diagram form the part of the circuit permitting to put the samples into memory, the whole of the correlator not being described since it can be of the same type as that described in the reference patent and particularly in relation to FIGS. 7 and 15 of this patent.

FIG. 23 shows that the bistable circuits $BS_1$ and $BS_2$ of FIG. 6 of the reference patent and which serve to staticize the sign function of the first modified variable $z_1$ and of the second modified variable $z_2$ have their outputs feeding an exclusive-OR circuit $XOR_2$ which may be of the type envisaged in particular in relation to FIGS. 3 and 7 of the reference patent and which thus produces the sign function of $z_1 z_2$. On the other hand, bistable circuits $BS_3 \ldots BS_n$ are also provided to staticize the sign functions of the other modified variables $z_3 \ldots z_n$, but the outputs of these $n-2$ bistables do not directly drive a parity detector $XOR_{n-2}$, this drive being made by bistable circuits $BS'_3 \ldots BS'_n$ which are associated to the bistables $BS_3 \ldots BS_n$ in such a manner as to stand respectively in cascade with the latter so that their inputs are driven by the outputs of the corresponding bistables out of the series $BS_3 \ldots BS_n$ and this by means of the AND gates $GA_3 \ldots GA_n$ respectively. These gates are authorized to effect the transfer of the information contained for instance in $BS_3$ towards $BS'_3$ at an appropriate moment at the end of the sampling cycle, that is to say if there are 100 samples from 00 to 99, during a time when counter HCT in FIG. 7 of the reference patent is in its condition $hct_{99}$ and corresponding to the derivation of the hundredth sample of the cycle for the modified variable $z_2$.

Figure 22:
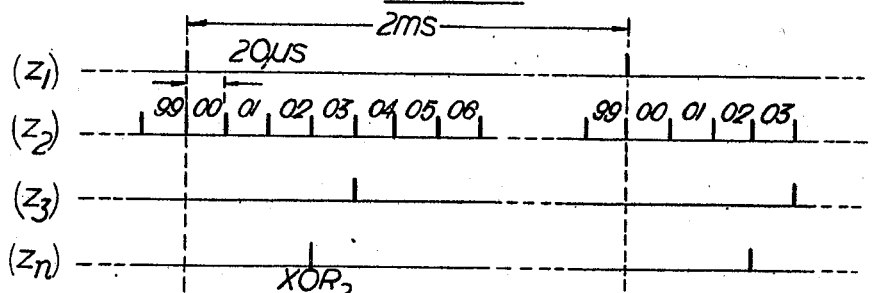

These different times are represented in FIG. 22 which shows four waveforms corresponding to the four series of samples taken from the modified variables $z_1$, $z_2$, $z_3$ and $z_n$. The variable $z_1$ used as reference is solely sampled during the time intervals 00 which like the others, have a duration of 20 microseconds and are reproduced every two milliseconds, these last time intervals corresponding to the period of one cycle. On the other hand, $z_2$ is regularly sampled every 20 microseconds, i.e. for every time interval from 00 to 99. The other modified variables from $z_3$ to $z_n$ are sampled once per cycle of 2 milliseconds and for instance at the time 03 for $z_3$ and at the time 02 for $z_n$, as shown.

Thus it is seen that the exclusive-OR circuit $XOR_2$ may directly calculate the sign function $z_1 z_2$ and this sign function is sent every 20 microseconds by the output of $XOR_2$ into an input staticizing bistable $BCT_0$ which like counter BCT of the reference patent permits to staticize the bits stored in the memory MS.

Every 20 microseconds, a new sign function of $z_1 z_2$ will be inscribed in $BCT_0$ and at the end of every time interval of 20 microseconds, it will be inscribed in the corresponding row of the memory MS among the 100 rows of the latter and as the 26th bit of each word, the 25 other bits corresponding to the staticizing capacity of counter BCT. As the store MS is read cyclically, a new word being staticized in BCT every 20 microseconds, the sign function of $z_1 z_2$ transmitted by $BCT_0$ will be available in the next cycle after 2 milliseconds and an output staticizing bistable $BCT_1$ is foreseen to staticize this sign function of $z_1 z_2$ obtained during the preceding cycle. The output of $BCT_1$ drives the circuit $XOR_{n-1}$ in the same way as the outputs from the bistable $BS'_3$ to $BS'_n$, that is to say, that the circuit $XOR_{n-1}$ which may be realized in accordance with the circuit of FIG. 3 of the reference patent and which thus comprises an assembly of $n-2$ exclusive-OR circuits will constantly compute the products of the sign function of $z_1 z_2$, obtained exactly one period of 2 milliseconds previously, by the sign function of $z_3 \ldots z_n$ and which becomes available at the beginning of each cycle of 2 milliseconds when the different samples of $z_3, z_4, \ldots z_n$ obtained during the previous cycle of 2 milliseconds are transferred from the bistables such as $BS_3$ to the bistables such as $BS'_3$.

In other words, the circuit $XOR_{n-1}$ constantly provides at its output the sign function of the product of all variables from $z_1$ to $z_n$. It may be assumed that the output of $XOR_{n-1}$ is composed of a normal output and of a complementary output so as to drive counter BCT in the same manner as foreseen in FIG. 7 of the reference patent where the case of a reversible counter for BCT has been envisaged, which is not however essential. It should be remarked that with respect to the circuit of FIG. 15 of the reference patent, the 100 bistable circuits previously necessary for the variable $z_2$ have disappeared, only bistable $BS_2$ being conserved. The duplication of the bistables for the other variables is maintained with the exception of the variable $z_1$ for which only bistable $BS_1$ is necessary, its staticized result being immediately exploited to place it in memory into MS. But the bistables such as $BS_3/BS'_3$ now being connected in cascade, it is no longer necessary to duplicate the parity detectors such as $XOR_{n-1}$ in the reference patent and the number of exclusive-OR gates is limited to the minimum of $n-1$, i.e. one for $XOR_2$ and $n-2$ for $XOR_{n-1}$. Only the input and output staticizing bistables $BCT_{0/1}$ must be added and the memory MS of $100 \times 25$ bits becomes a $100 \times 26$ bits memory.

In the reference patent, each unit time interval of 20 microseconds, i.e. the time intervals from 00 to 99, is divided into four time intervals of 5 microseconds each, i.e. $t_A$, $t_B$, $t_C$ and $t_D$, in such a manner as to be able to ensure a correct sequence for the different logical operations which may be required during each elemental time of 20 microseconds. In FIG. 23, the reading of each 26-bits word stored in MS is done during time $t_A$. At the end of $t_A$ the information is available in the staticizing device in such a way that during the following time interval $t_B$ the logical circuit $XOR_2$ can produce the sign function of $z_1z_2$ corresponding to the samples of the 2 millisecond period considered while on the other hand, the logical circuit $XOR_{n-1}$ can produce the sign function of the product of all the variables coming from the samples taken during the preceding 2 millisecond period. At the end of the time $t_B$, the binary result provided by $XOR_2$, will be transferred into the input staticizing device $BCT_0$ while as previously, the binary result $XOR_{n-1}$ will be transferred to the counter BCT. The time interval $t_C$ is then available for rewriting the staticized data into the memory MS, i.e. the 25 bits staticized in BCT and the supplementary bit stored by $BCT_0$. Finally, the time interval $t_D$ is available for resetting to zero all the staticizing devices of the buffer memory MS. For the information transfer from the bistable each as $BS_3$ towards $BS'_3$ during the last time interval of 20 microseconds of a cycle of 100, defined by the timing counter HCT (not shown) being in its condition $hct_{99}$, it will be possible to choose for instance time interval $t_C$ to transfer the information, that is to say after the exploitation by $XOR_{n-1}$ of the state of the bistables $BS'_3$ to $BS'_n$.

Finally it will be remarked that it is in principle possible to avoid the duplication of the bistables $BS_3, \ldots, BS_n$ and the use of the gates $GA_3, \ldots, GA_n$ of FIG. 23. This may be conceived if one is ready to lengthen the computation time, all other things being equal, and which was not the case of the arrangement of FIG. 23 since there is a simple shift of one period of 2 milliseconds in what concerns the availability of the final result which is evidently a ridiculously small time increase in the case of a correlator where the number of series of $n$ samples for each point of the correlation function is high, e.g. from $10^4$ to $10^6$, which implies that the necessary number of 2 millisecond cycles is precisely equal to these high values.

But it may be conceived for the circuit of FIG. 23 that the exploitation of the results provided by the logical circuits $XOR_2$ and $XOR_{n-1}$ can only be done during well defined distinct time intervals and for instance during interlaced periods of 2 milliseconds. These even and odd cycles of 2 milliseconds may be defined with the help of a bistable operating at a scale-of-2 and triggered at the end of each cycle of 2 milliseconds, such as $BS_0$ in FIG. 15 of the above mentioned Belgian patent. Thus the logical circuit $XOR_2$ would only be authorized to provide these results during the odd 2 milliseconds cycles while the logical circuit $XOR_{n-1}$ would provide its results during the even cycles of 2 milliseconds. In this case, during each odd cycle $XOR_2$ will provide the various sign functions of $z_1z_2$ to bistable $BCT_0$ for putting them into memory in the various rows of MS while during this same odd cycle, the samples of the variables $z_3$ to $z_n$ will be put into memory directly in the bistables $BS'_3$ to $BS'_n$, the bistables $BS_3$ to $BS_n$ being eliminated.

On the other hand, during the even 2 milliseconds cycles no sample will be taken for any of the variables from $z_1$ to $z_n$ but the logical circuit $XOR_{n-1}$ will now be authorized to provide the results giving the sign functions of the product of the $n$ variables, the coordinate memory MS successively staticizing into $BCT_1$ the 100 bits provided by $BCT_0$ during the preceding odd 2 milliseconds cycle. A single staticizing bistable $BCT_0$ is now necessary for the results of $XOR_2$ since the old cycles are used to inscribe them into MS while they are exploited during the even cycles. During the latter, $BCT_0$ will be reset at time $t_B$.

This simplification of the equipment naturally entails a longer time to perform a given computation. In principle, the computation time will be doubled if it is envisaged that the odd and even cycles have the same time duration but it will be remarked that this is not absolutely essential and that the odd cycles during which the various variables are sampled may very well have a certain duration conditioned by the rapidity with which the variables may be fed to the correlator, while the even cycles could have a notably lower duration if the logical circuits of the correlator may work at a higher speed.

We claim:

1. Apparatus for the computation of statistical averages of functions permitting the computation of moments of any order and relative to any number of variables provided at the input of the apparatus, comprising:

a plurality of variable function generators ($FX_1, \ldots FX_i, \ldots FX_n$) for producing corresponding variables ($X_1, \ldots X_i, \ldots X_n$);

a plurality of reference variable generators ($FY_1, \ldots FY_i, \ldots FY_n$) for producing corresponding reference variables ($Y_1, \ldots Y_i, \ldots Y_n$);

a plurality of associating devices ($SA_1, \ldots SA_i, \ldots SA_n$) coupled to provide corresponding outputs of modified variables $(Z_1 = X_1 - Y_1, \ldots Z_i = X_i - Y_i, \ldots Z_n = X_n - Y_n)$ and a correlator with $n$ inputs which are fed by the outputs of said associating devices producing the sign function of $Z$ $\overline{(\text{sgn } Z = \text{sgn } Z_1, \ldots Z_i, \ldots Z_n)}$, whereby, for a series of $n$ variables $X_i (1 \leq i \leq n)$ where $n$ is an integer at least equal to unity, the apparatus computes the statistical average of the product $Q_1(X_1) \ldots Q_i(X_i) \ldots Q_n(X_n)$, where the functions $Q_i(X_i)$ are arbitrary functions of the corresponding variable $X_i$, by adding to each of the variables $X_i$, before determining its polarity, the corresponding reference value $Y_i$ whose probability density $q_i(Y_i)$ is equal to $$\frac{1}{2} \frac{dQ_i(Y_i)^i}{dY_i}$$

the various reference variables $Y_i$ being statistically independent from the initial variables $X_i$ and statistically independent from one another.

2. The apparatus of claim 1 including a plurality of double wave rectifiers ($RE_1, \ldots RE_i, \ldots RE_n$) in the case of Q functions which are even powers of the variable, and the corresponding double wave rectifier $RE_i$ is coupled to receive at its input the variable $X_i$ when in analogue form and to produce at its output the modulus of variable $X_i$, the modulus being coupled with the corresponding reference value $Y_i$ to the associating device $SA_i$.

3. The apparatus of claim 1 wherein the reference variable generators produce reference variables having characteristics in which their corresponding $Q_i(X_i)$ functions are proportional to a power of the variable, each of the reference generators producing a pulse train with amplitude variations and comprising:

a bistable circuit whose inputs are fed by a first and second trigger pulse, each having a Poisson distribution, through respective AND gates which are normally unblocked except during a first time delay separated from the appearance of a pulse by a second time delay, said pulse produced during this first delay causes the bistable circuit to unblock either a first or second AND gate, depending on the condition of the bistable, permitting resonant transfer of a predetermined positive charge from a first to a third capacitor, or the transfer of a negative charge of equal amplitude from a second capacitor to the third capacitor, a resistance is provided across said third capacitor to produce an exponential discharge of the voltage at the terminal of said third capacitor, and a third and fourth AND gate is coupled to the first and second capacitors to permit the respective recharge to the positive or the negative voltage of like amplitude except during the first delay time.

4. The apparatus of claim 1 wherein the reference variable generators produce a pulse train having exponential amplitude variations in response to input trigger pulses having a Poisson distribution, the apparatus including a bistable circuit operated on a scale-of-two triggered from one condition to another at the rhythm of the input pulses, an output pulse is produced during a time delay following the appearance of a trigger pulse causing the bistable circuit to unblock a first or second AND gate during this delay time, permitting resonant transfer of a predetermined positive charge from a first to a third capacitor, or to transfer a negative charge having an amplitude equal to the first capacitor, from a second to the third capacitor, a resistance is coupled across the third capacitor to produce an exponential discharge for the voltage at the terminals of this third capacitor, and a third and fourth AND gate coupled to the first and second capacitors to permit respective recharge, the first and second capacitor being alternately recharged in accordance with the condition of the bistable circuit.

5. The apparatus of claim 1 wherein the reference variable $Y_i$ is provided by a waveform generator having a linear network responsive to periodic input pulses, the generator including a controlled pulse generator (PG) coupled to and controlled by a detecting circuit (DC) which is coupled to the output of a linear network (LN) adapted to produce the reference variable $Y_i$, the detecting circuit (DC) produces a trigger signal upon the output waveform reaching a predetermined amplitude regardless of its polarity, a modifying circuit (VM) coupled to modify the value of the pulse moment transmitted by generator (PG) to network (LN), the modifying circuit (VM) is operatively responsive to a random pulse generator (RG) via a memory circuit (MC), and the trigger pulse signal is further coupled to cause discharge of reactive elements in the linear network so that it produces the same amplitude function at each pulse whose duration is a random variable.

6. The apparatus of claim 5 wherein the waveform at the output of the linear network has an instantaneous amplitude Y such that $$\frac{t}{T} = \left(\frac{Y}{A}\right)^m$$

where $t$ is the time variable, A is the predetermined amplitude, T is the interval between successive pulses from the controlled pulse generator, and $m$ is an arbitrary constant.

7. Apparatus for computing statistical averages using a polarity coincidence method in accordance with which a reference variable $Y_i$ is associated to each variable $X_i$ to compute the sign function of each modified variable $Z_i = X_i - Y_i$, the apparatus including:

a memory device for each variable $X_i$ to store the value of this variable during a time that a random pulse generator associated with each device produces different possible values of the reference variable $Y_i$;

a counter coupled to the random generator and having as many distinct conditions as there are possible values for the reference variable $Y_i$;

a comparator coupled between each said counter and memory device to determine if the stored value is higher or lower than the value of the counter;

a detecting means coupled to the comparator to provide the sign function of the product of the variable $Z_i$; and a pulse source coupled to the encounter for causing the counter to pass through all the possible values of the reference variable $Y_i$ from an arbitrary start condition during the time that the variable $X_i$ is present in the memory device.

References Cited

UNITED STATES PATENTS

| | | | |
|---|---|---|---|
| 2,767,914 | 10/1956 | Merrill et al. | 235—151.13 |
| 3,182,181 | 5/1965 | Schumann | 235—150.51 |
| 3,257,652 | 6/1966 | Foster | 235—151.13 |
| 3,260,838 | 7/1966 | Anderson | 235—151.13 |
| 3,404,261 | 10/1968 | Vespers et al. | 235—181 |

MALCOLM A. MORRISON, Primary Examiner

F. D. GRUBER, Assistant Examiner

U.S. Cl. X.R.

235—150.1, 150.5, 150.51; 340—146.2